(12) United States Patent
Ran

(10) Patent No.: US 12,231,232 B2
(45) Date of Patent: Feb. 18, 2025

(54) PHYSICAL CODING SUBLAYER WITH MODIFIED BIT ORDERING TO IMPROVE ERROR BURST RESILIENCY

(71) Applicant: Cisco Technology, Inc., San Jose, CA (US)

(72) Inventor: Adee O. Ran, Maayan Baruch (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 42 days.

(21) Appl. No.: 18/085,698

(22) Filed: Dec. 21, 2022

(65) Prior Publication Data
US 2024/0014927 A1 Jan. 11, 2024

Related U.S. Application Data

(60) Provisional application No. 63/358,264, filed on Jul. 5, 2022.

(51) Int. Cl.
*H04L 1/00* (2006.01)

(52) U.S. Cl.
CPC .......... *H04L 1/0041* (2013.01); *H04L 1/0045* (2013.01)

(58) Field of Classification Search
None
See application file for complete search history.

(56) References Cited

U.S. PATENT DOCUMENTS

| 10,693,587 B2 * | 6/2020 | Shokrollahi | .......... H03M 13/27 |
| 2003/0053435 A1 * | 3/2003 | Sindhushayana | ..... H04L 1/0059 370/347 |
| 2010/0042865 A1 | 2/2010 | Creigh | |
| 2015/0381316 A1 | 12/2015 | Basso et al. | |
| 2016/0087753 A1 * | 3/2016 | Ran | ....................... H03M 13/25 370/468 |
| 2017/0041094 A1 | 2/2017 | Basso et al. | |
| 2017/0170927 A1 | 6/2017 | Stone et al. | |
| 2019/0097748 A1 * | 3/2019 | Loprieno | .............. H04L 1/0057 |
| 2020/0145022 A1 | 5/2020 | Basso et al. | |

FOREIGN PATENT DOCUMENTS

| CA | 2334499 A1 * | 12/1993 | ..... G01R 31/318385 |
| CA | 3178909 A1 * | 11/2020 | ........ H03M 13/1515 |
| EP | 3972221 A1 * | 3/2022 | ........ H03M 13/2906 |
| WO | 2021/109748 A1 | 6/2021 | |

OTHER PUBLICATIONS

IEEE, "147. Physical Coding Sublayer (PCS), Physical Medium Attachment (PMA) sublayer and baseband medium, type 10BASE-T1S," https://www.ieee802.org/3/cg/public/Nov2017/8023cg_D0p3_T1S_revB.PDF, Nov. 2017, 30 pages.

* cited by examiner

*Primary Examiner* — Guerrier Merant
(74) *Attorney, Agent, or Firm* — Edell, Shapiro & Finnan, LLC

(57) ABSTRACT

Techniques are provided to provide modified bit sequences generated by the Physical Coding Sublayer (PCS) functional block in a way that considers the subsequent bit-mux operation of the Physical Media Attachment (PMA) sublayer functional block, in order to create symbol sequences for transmission over the physical channels with properties that optimize the performance of the Forward Error Correction (FEC) decoder with error bursts.

22 Claims, 19 Drawing Sheets

FIG.5

| PHYSICAL LANE # | 0 | | 1 | | 2 | | 3 | |
|---|---|---|---|---|---|---|---|---|
| 23 | B121 | A121 | B131 | A131 | B141 | A141 | B151 | A151 |
| 22 | B81 | A81 | B91 | A91 | B101 | A101 | B111 | A111 |
| 21 | B120 | A120 | B130 | A130 | B140 | A140 | B150 | A150 |
| 20 | B80 | A80 | B90 | A90 | B100 | A100 | B110 | A110 |
| 19 | A49 | B49 | A59 | B59 | A69 | B69 | A79 | B79 |
| 18 | A9 | B9 | A19 | B19 | A29 | B29 | A39 | B39 |
| 17 | A48 | B48 | A58 | B58 | A68 | B68 | A78 | B78 |
| 16 | A8 | B8 | A18 | B18 | A28 | B28 | A38 | B38 |
| | ••• | | ••• | | ••• | | ••• | |
| 2 | A1 | B1 | A11 | B11 | A21 | B21 | A31 | B31 |
| 1 | A40 | B40 | A50 | B50 | A60 | B60 | A70 | B70 |
| 0 (first) | A0 | B0 | A10 | B10 | A20 | B20 | A30 | B30 |

TIME INDEX →

| LOGICAL LANE # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 19 (LAST) | B152 | B153 | A152 | A153 | B154 | B155 | A154 | A155 | B156 | B157 | A156 | A157 | B158 | B159 | A158 | A159 |
| 18 | A144 | A145 | A144 | A145 | A146 | B147 | A146 | A147 | A148 | A149 | A148 | A149 | B150 | B151 | A150 | A151 |
| 17 | B136 | B137 | A136 | A137 | B138 | B139 | A138 | A139 | A140 | A141 | B140 | B141 | A142 | A143 | B142 | B143 |
| 16 | A128 | A129 | A128 | A129 | B130 | B131 | A130 | A131 | B132 | B133 | A132 | A133 | B134 | B135 | A134 | A135 |
| 15 | A120 | A121 | A120 | B121 | A122 | A123 | B122 | B123 | A124 | A125 | B124 | B125 | A126 | A127 | B126 | B127 |
| 14 | B112 | B113 | A112 | A113 | B114 | B115 | A114 | A115 | B116 | B117 | A116 | A117 | B118 | B119 | A118 | A119 |
| 13 | A104 | A105 | B104 | B105 | A106 | A107 | B106 | B107 | A108 | A109 | B108 | B109 | A110 | A111 | B110 | B111 |
| 12 | B96 | B97 | A96 | A97 | B98 | B99 | A98 | A99 | B100 | A101 | B100 | B101 | A102 | A103 | B102 | B103 |
| 11 | A88 | A89 | B88 | B89 | B90 | B91 | A90 | A91 | B92 | B93 | A92 | A93 | B94 | B95 | A94 | A95 |
| 10 | A80 | A81 | B80 | B81 | A82 | A83 | B82 | B83 | A84 | A85 | B84 | B85 | A86 | A87 | B86 | B87 |
| 9 | B72 | B73 | A72 | A73 | A74 | A75 | B74 | B75 | A76 | A77 | B76 | B77 | A78 | A79 | B78 | B79 |
| 8 | A64 | A65 | B64 | B65 | A66 | A67 | B66 | B67 | A68 | A69 | B68 | B69 | A70 | A71 | B70 | B71 |
| 7 | B56 | B57 | A56 | A57 | A58 | A59 | B58 | B59 | A60 | A61 | B60 | B61 | A62 | A63 | B62 | B63 |
| 6 | B48 | B49 | A48 | B49 | B50 | B51 | A50 | A51 | B52 | B53 | A52 | A53 | B54 | B55 | A54 | A55 |
| 5 | A40 | A41 | B40 | B41 | A42 | A43 | B42 | B43 | A44 | A45 | B44 | B45 | A46 | A47 | B46 | B47 |
| 4 | A32 | A33 | A32 | A33 | A34 | A35 | A34 | A35 | B36 | A37 | A36 | A37 | B38 | B39 | A38 | A39 |
| 3 | B24 | A25 | B24 | B25 | A26 | A27 | B26 | B27 | A28 | A29 | B28 | B29 | B30 | B31 | A30 | A31 |
| 2 | B16 | B17 | A16 | A17 | A18 | B19 | A18 | A19 | A20 | A21 | B20 | B21 | A22 | A23 | B22 | B23 |
| 1 | A8 | A9 | B8 | B9 | B10 | B11 | A10 | A11 | B12 | B13 | A12 | A13 | B14 | B15 | A14 | A15 |
| 0 (FIRST) | A0 | A1 | B0 | B1 | A2 | A3 | B2 | B3 | A4 | A5 | B4 | B5 | A6 | A7 | B6 | B7 |

TIME INDEX →

| LOGICAL LANE # | 0 | 1 | 2 | 3 | 4 | 5 | 6 | 7 |
|---|---|---|---|---|---|---|---|---|
| 19 (LAST) | B72 | B73 | B74 | B75 | B76 | B77 | B78 | B79 |
| 18 | A74 | A75 | A76 | A77 | A78 | A79 | B70 | B71 |
| 17 | B66 | B67 | B68 | B69 | A70 | A71 | A72 | A73 |
| 16 | A68 | A69 | B60 | B61 | B62 | B63 | B64 | B65 |
| 15 | A60 | A61 | A62 | A63 | A64 | A65 | A66 | A67 |
| 14 | B52 | B53 | B54 | B55 | B56 | B57 | B58 | B59 |
| 13 | A54 | A55 | A56 | A57 | A58 | A59 | B50 | B51 |
| 12 | B46 | B47 | B48 | B49 | A50 | A51 | A52 | A53 |
| 11 | A48 | A49 | B40 | B41 | B42 | B43 | B44 | B45 |
| 10 | A40 | A41 | A42 | A43 | A44 | A45 | A46 | A47 |
| 9 | B32 | B33 | B34 | B35 | B36 | B37 | B38 | B39 |
| 8 | A34 | A35 | A36 | A37 | A38 | A39 | B30 | B31 |
| 7 | B26 | B27 | B28 | B29 | A30 | A31 | A32 | A33 |
| 6 | A28 | A29 | B20 | B21 | B22 | B23 | B24 | B25 |
| 5 | A20 | A21 | A22 | A23 | A24 | A25 | A26 | A27 |
| 4 | B12 | B13 | B14 | B15 | B16 | B17 | B18 | B19 |
| 3 | A14 | A15 | A16 | A17 | A18 | A19 | B10 | B11 |
| 2 | B6 | B7 | B8 | B9 | A10 | A11 | A12 | A13 |
| 1 | A8 | A9 | B0 | B1 | B2 | B3 | B4 | B5 |
| 0 (FIRST) | A0 | A1 | A2 | A3 | A4 | A5 | A6 | A7 |

TIME INDEX →

| TIME INDEX \ LOGICAL LANE # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 19 (LAST) | D122 | D123 | D132 | D133 | D124 | D125 | D134 | D135 | D126 | D127 | D136 | D137 | D128 | D129 | D138 | D139 |
| 18 | C124 | C125 | C134 | C135 | C126 | C127 | C136 | C137 | C128 | C129 | C138 | C139 | C120 | C121 | C130 | C131 |
| 17 | B126 | B127 | B136 | B137 | B128 | B129 | B138 | B139 | B120 | B121 | B130 | B131 | B122 | B123 | B132 | B133 |
| 16 | A128 | A129 | A138 | A139 | B120 | B121 | B130 | B131 | B122 | B123 | B132 | B133 | B124 | B125 | B134 | B135 |
| 15 | A120 | A121 | A130 | A131 | A122 | A123 | A132 | A133 | A124 | A125 | A134 | A135 | A126 | A127 | A136 | A137 |
| 14 | D82 | D83 | D92 | D93 | D84 | D85 | D94 | D95 | D86 | D87 | D96 | D97 | D88 | D89 | D98 | D99 |
| 13 | C84 | C85 | C94 | C95 | C86 | C87 | C96 | C97 | C88 | C89 | C98 | C99 | C80 | C81 | C90 | C91 |
| 12 | B86 | B87 | B96 | B97 | B88 | B89 | B98 | B99 | B80 | B81 | B90 | B91 | B82 | B83 | B92 | B93 |
| 11 | A88 | A89 | A98 | A99 | A80 | A81 | A90 | A91 | A82 | A83 | A92 | A93 | A84 | A85 | A94 | A95 |
| 10 | A80 | A81 | A90 | A91 | A82 | A83 | A92 | A93 | A84 | A85 | A94 | A95 | A86 | A87 | A96 | A97 |
| 9 | D42 | D43 | D52 | D53 | D44 | D45 | D54 | D55 | D46 | D47 | D56 | D57 | D48 | D49 | D58 | D59 |
| 8 | C44 | C45 | C54 | C55 | C46 | C47 | C56 | C57 | C48 | C49 | C58 | C59 | C40 | C41 | C50 | C51 |
| 7 | B46 | B47 | B56 | B57 | B48 | B49 | B58 | B59 | B40 | B41 | B50 | B51 | B42 | B43 | B52 | B53 |
| 6 | A48 | A49 | A58 | A59 | A40 | A41 | A50 | A51 | A42 | A43 | A52 | A53 | A44 | A45 | A54 | A55 |
| 5 | A40 | A41 | A50 | A51 | A42 | A43 | A52 | A53 | A44 | A45 | A54 | A55 | A46 | A47 | A56 | A57 |
| 4 | D2 | D3 | D12 | D13 | D4 | D5 | D14 | D15 | D6 | D7 | D16 | D17 | D8 | D9 | D18 | D19 |
| 3 | C4 | C5 | C14 | C15 | C6 | C7 | C16 | C17 | C8 | C9 | C18 | C19 | C0 | C1 | C10 | C11 |
| 2 | B6 | B7 | B16 | B17 | B8 | B9 | B18 | B19 | B0 | B1 | B10 | B11 | B2 | B3 | B12 | B13 |
| 1 | A8 | A9 | A18 | A19 | A0 | A1 | A10 | A11 | A2 | A3 | A12 | A13 | A4 | A5 | A14 | A15 |
| 0 (FIRST) | A0 | A1 | A10 | A11 | A2 | A3 | A12 | A13 | A4 | A5 | A14 | A15 | A6 | A7 | A16 | A17 |

| TIME INDEX | PHYSICAL LANE # | 0 | | 1 | | 2 | | 3 | |
|---|---|---|---|---|---|---|---|---|---|
| 39 | | D48 | D49 | D58 | D59 | D68 | D69 | D78 | D79 |
| 38 | | D46 | D47 | D56 | D57 | D66 | D67 | D76 | D77 |
| 37 | | D44 | D45 | D54 | D55 | D64 | D65 | D74 | D75 |
| 36 | | D42 | D43 | D52 | D53 | D62 | D63 | D72 | D73 |
| 35 | | D40 | D41 | D50 | D51 | D60 | D61 | D70 | D71 |
| 34 | | C48 | C49 | C58 | C59 | C68 | C69 | C78 | C79 |
| 33 | | C46 | C47 | C56 | C57 | C66 | C67 | C76 | C77 |
| 32 | | C44 | C45 | C54 | C55 | C64 | C65 | C74 | C75 |
| 31 | | C42 | C43 | C52 | C53 | C62 | C63 | C72 | C73 |
| 30 | | C40 | C41 | C50 | C51 | C60 | C61 | C70 | C71 |
| 29 | | B48 | B49 | B58 | B59 | B68 | B69 | B78 | B79 |
| 28 | | B46 | B47 | B56 | B57 | B66 | B67 | B76 | B77 |
| 27 | | B44 | B45 | B54 | B55 | B64 | B65 | B74 | B75 |
| 26 | | B42 | B43 | B52 | B53 | B62 | B63 | B72 | B73 |
| 25 | | B40 | B41 | B50 | B51 | B60 | B61 | B70 | B71 |
| 24 | | A48 | A49 | A58 | A59 | A68 | A69 | A78 | A79 |
| 23 | | A46 | A47 | A56 | A57 | A66 | A67 | A76 | A77 |
| 22 | | A44 | A45 | A54 | A55 | A64 | A65 | A74 | A75 |
| 21 | | A42 | A43 | A52 | A53 | A62 | A63 | A72 | A73 |
| 20 | | A40 | A41 | A50 | A51 | A60 | A61 | A70 | A71 |
| 19 | | D8 | D9 | D18 | D19 | D28 | D29 | D38 | D39 |
| 18 | | D6 | D7 | D16 | D17 | D26 | D27 | D36 | D37 |
| 17 | | D4 | D5 | D14 | D15 | D24 | D25 | D34 | D35 |
| 16 | | D2 | D3 | D12 | D13 | D22 | D23 | D32 | D33 |
| 15 | | D0 | D1 | D10 | D11 | D20 | D21 | D30 | D31 |
| 14 | | C8 | C9 | C18 | C19 | C28 | C29 | C38 | C39 |
| 13 | | C6 | C7 | C16 | C17 | C26 | C27 | C36 | C37 |
| 12 | | C4 | C5 | C14 | C15 | C24 | C25 | C34 | C35 |
| 11 | | C2 | C3 | C12 | C13 | C22 | C23 | C32 | C33 |
| 10 | | C0 | C1 | C10 | C11 | C20 | C21 | C30 | C31 |
| 9 | | B8 | B9 | B18 | B19 | B28 | B29 | B38 | B39 |
| 8 | | B6 | B7 | B16 | B17 | B26 | B27 | B36 | B37 |
| 7 | | B4 | B5 | B14 | B15 | B24 | B25 | B34 | B35 |
| 6 | | B2 | B3 | B12 | B13 | B22 | B23 | B32 | B33 |
| 5 | | B0 | B1 | B10 | B11 | B20 | B21 | B30 | B31 |
| 4 | | A8 | A9 | A18 | A19 | A28 | A29 | A38 | A39 |
| 3 | | A6 | A7 | A16 | A17 | A26 | A27 | A36 | A37 |
| 2 | | A4 | A5 | A14 | A15 | A24 | A25 | A34 | A35 |
| 1 | | A2 | A3 | A12 | A13 | A22 | A23 | A32 | A33 |
| 0 | | A0 | A1 | A10 | A11 | A20 | A21 | A30 | A31 |

| PHYSICAL LANE # | 0 | 1 | 2 | 3 | 4 | 5 | 6 | 7 |
|---|---|---|---|---|---|---|---|---|
| 19 | D46 | D47 | D56 | D57 | D66 | D67 | D76 | D77 |
| 18 | D42 | D43 | D52 | D53 | D62 | D63 | D72 | D73 |
| 17 | C48 | C49 | C58 | C59 | C68 | C69 | C78 | C79 |
| 16 | C44 | C45 | C54 | C55 | C64 | C65 | C74 | C75 |
| 15 | C40 | C41 | C50 | C51 | C60 | C61 | C70 | C71 |
| 14 | B46 | B47 | B56 | B57 | B66 | B67 | B76 | B77 |
| 13 | B42 | B43 | B52 | B53 | B62 | B63 | B72 | B73 |
| 12 | A48 | A49 | A58 | A59 | A68 | A69 | A78 | A79 |
| 11 | A44 | A45 | A54 | A55 | A64 | A65 | A74 | A75 |
| 10 | A40 | A41 | A50 | A51 | A60 | A61 | A70 | A71 |
| 9 | D6 | D7 | D16 | D17 | D26 | D27 | D36 | D37 |
| 8 | D2 | D3 | D12 | D13 | D22 | D23 | D32 | D33 |
| 7 | C8 | C9 | C18 | C19 | C28 | C29 | C38 | C39 |
| 6 | C4 | C5 | C14 | C15 | C24 | C25 | C34 | C35 |
| 5 | C0 | C1 | C10 | C11 | C20 | C21 | C30 | C31 |
| 4 | B6 | B7 | B16 | B17 | B26 | B27 | B36 | B37 |
| 3 | B2 | B3 | B12 | B13 | B22 | B23 | B32 | B33 |
| 2 | A8 | A9 | A18 | A19 | A28 | A29 | A38 | A39 |
| 1 | A4 | A5 | A14 | A15 | A24 | A25 | A34 | A35 |
| 0 | A0 | A1 | A10 | A11 | A20 | A21 | A30 | A31 |

TIME INDEX →

1400

PHYSICAL CODING SUBLAYER WITH MODIFIED BIT ORDERING TO IMPROVE ERROR BURST RESILIENCY

CROSS-REFERENCE TO RELATED APPLICATION

This application claims priority to U.S. Provisional Application No. 63/358,264, filed Jul. 5, 2022, the entirety of which is incorporated by reference.

TECHNICAL FIELD

The present disclosure relates to network communication.

BACKGROUND

The Ethernet Physical Coding Sublayer (PCS) functional block creates bit sequences for each of its logical output lanes. These bit sequences may then be bitwise-multiplexed (bit-mux) by a Physical Media Attachment (PMA) functional block to create sequences of physical symbols. These symbols are transmitted over noisy channels and may be received with errors, often with bursts of consecutive errors. A Reed-Solomon Forward Error Correction (RS-FEC) code may be used to correct occasional error bursts.

The PCS functional block defined in clause 119 of IEEE 802.3, which followed the RS-FEC of clause 91, creates bit sequences that are handled well by the RS-FEC decoder even with bursts of errors if there is no bit-mux PMA. However, when bit-muxing is applied, the RS-FEC performance is degraded (the higher the muxing ratio, the more degradation is caused).

If a PCS functional block based on clause 119 of IEEE 802.3 is used at 800 Gb/s over four physical lanes (200 Gb/s per lane), the multiplexing (muxing) level is 8:1, which creates an unacceptable degradation.

BRIEF DESCRIPTION OF THE DRAWINGS

FIG. 5 illustrates a table depicting bit ordering for the existing clause 119 400GBASE-R PCS with 2-way codeword interleaving.

FIG. 6 illustrates a table depicting the resulting physical lane symbol ordering of existing clause 119 400GBASE-R PCS after bit-muxing to four physical lanes.

FIG. 8 illustrates a table depicting a modified PCS bit ordering for 400GBASE-R, according to an example embodiment.

FIG. 10 illustrates a table depicting a modified PCS bit ordering for 200GBASE-R, according to an example embodiment.

FIGS. 12A and 12B illustrate a table depicting PCS bit ordering for 800 Gb/s with 4-way codeword interleaving, according to an example embodiment.

FIG. 13 illustrates a table depicting a resulting physical lane symbol ordering using the PCS bit ordering shown in FIGS. 12A and 12B after bit-muxing to four physical lanes, according to an example embodiment.

FIG. 14 illustrates a table depicting a resulting physical lane symbol ordering using the PCS bit ordering shown in FIGS. 12A and 12B after bit-muxing to eight physical lanes, according to an example embodiment.

DETAILED DESCRIPTION

Overview

Figure 1:
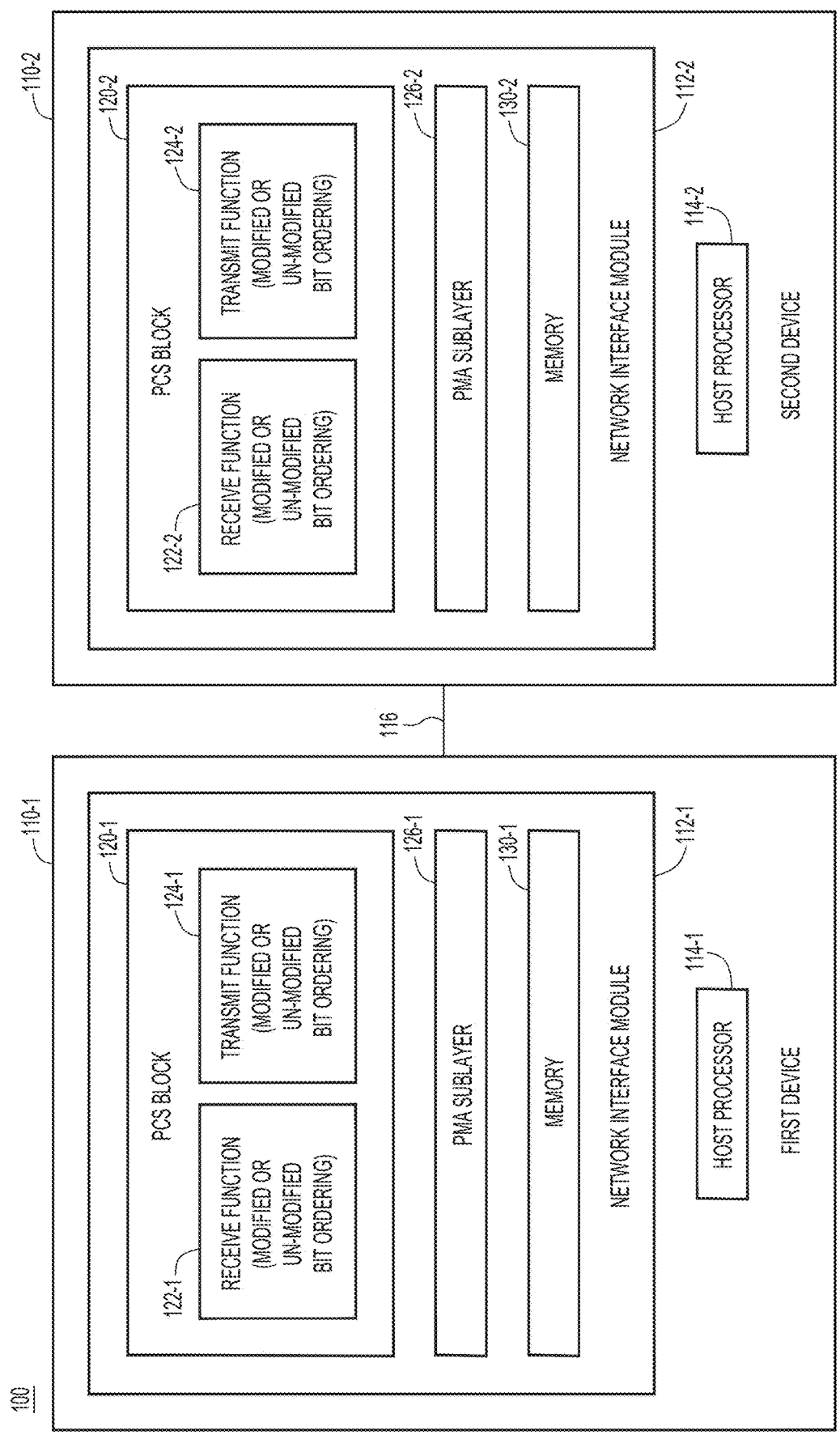
FIG. 1 is a block diagram of a network communication environment including two devices configured to engage in network communication with each other, at least one device being configured to perform modified PCS bit ordering techniques presented herein, according to an example embodiment.

Presented herein are techniques to provide modified bit sequences generated by the Physical Coding Sublayer (PCS) functional block in a way that considers the subsequent bit-mux operation of the Physical Media Attachment (PMA) sublayer functional block, in order to create symbol sequences for transmission over the physical channels with properties that optimize the performance of the Forward Error Correction (FEC) decoder with error bursts.

In one form, a method is provided for a transmit process including, for each forward error corrected (FEC) codeword of a plurality of FEC codewords of data to be transmitted over a channel, obtaining a symbol from each logical lane of a plurality of logical lanes to which the plurality of FEC codewords have been multiplexed; storing bits for the symbol from each logical lane of the plurality of logical lanes into a memory; and re-ordering bits stored in the memory according to a mapping that permutes the bits stored in memory to produce a re-ordered block of bits such that when the re-ordered block of bits is distributed to a plurality of modified logical lanes equal in number to the plurality of logical lanes and the plurality of modified logical lanes are bit-multiplexed to at least one physical lane, the at least one physical lane obtains a sequence of groups of bits for a symbol from one FEC codeword followed by a sequence of groups of bits for a symbol from another FEC codeword.

In another form, a method is provided for a receive process including: obtaining a stream of bits received for at least one physical lane from which a plurality of modified logical lanes have been de-multiplexed, which plurality of modified logical lanes is equal in number to a plurality of logical lanes from which an original block of bits was re-ordered according to a mapping that permuted the original block of bits to produce a re-ordered block of bits distributed to the plurality of modified logical lanes such that when the plurality of modified logical lanes was bit-multiplexed to the at least one physical lane, the at least one physical lane contains a sequence of a groups of bits for a symbol from one forward error corrected (FEC) codeword followed by a sequence of groups of bits for a symbol from another FEC codeword; storing the re-ordered block of bits obtained from the plurality of modified logical lanes to a memory; performing an inverse of the mapping on the re-ordered block of bits stored in the memory to obtain the original block of bits; and distributing the original block of bits to the plurality of logical lanes.

In still another form, a method is provided that is performed by a first device that is in communication with a second device, including: configuring a transmit function to use a modified bit ordering that maps bits from a plurality of logical lanes to a plurality of modified logical lanes that are bit-multiplexed to at least one physical lane for transmission to a second device; configuring a receive function to use a modified bit ordering for processing a stream of bits received from the second device on at least one physical lane from which a plurality of modified logical lanes have been de-multiplexed, the plurality of modified logical lanes being equal in number to a plurality of logical lanes from which an original block of bits was re-ordered according to the modified bit ordering; receiving an incoming bit stream from the second device; attempting to process the incoming bit stream from the second device with the receive function using the modified bit ordering; and when processing the incoming bit stream using the modified bit ordering is not successful, configuring the receive function of the first device to use an un-modified bit ordering for processing the incoming bit stream from the second device.

Example Embodiments

Presented herein are techniques to generate bit sequences by the PCS functional block in a way that considers the subsequent bit-mux operation of the PMA functional block, in order to create symbol sequences for transmission over the physical channels with properties that optimize the performance of FEC decoder when error bursts occur.

The modified bit sequences are created by relatively simple re-ordering of bits relative to the clause 119 PCS definition of IEEE 802.3. As a result, the change from existing PCS implementations (on both receive and transmit sides) is very easy to implement. In addition, it is easy to switch between the original order and the modified order, to provide backward compatibility with PCS implementations that do not use this bit order (such as the Ethernet Technology Consortium (ETC) PCS).

Similar bit sequences can be generated for 400 Gb/s and 200 Gb/s PCSs when used with 200 Gb/s per lane (two lanes or one lane respectively), to improve the RS-FEC performance in these cases. Backward compatibility with existing PCS designs can be implemented similarly.

While the bit sequences are optimized for 200 Gb/s per physical lane, they also provide an improvement (albeit smaller) over existing PCS bit ordering when used at 100 Gb/s per lane.

Referring first to FIG. 1, a diagram is shown of a network communication environment 100 showing, for simplicity, a first device 110-1 and a second device 110-2 configured to engage in network communication with each other. The first device 110-1 and the second device 110-2 may be any device capable of engaging in network communication, such as endpoint devices (computers, user devices, etc.) or intervening network devices such as switches, routers, gateways, wireless access points, etc. The first device 110-1 includes a network interface module 112-1 that performs operations to enable network communication. Similarly, the second device 110-2 includes a network interface module 112-2. Depending on the particular application, the first device 110-1 may include a host processor 114-1 and similarly the second device 110-1 may include a host processor 114-2. The first and second devices 110-1 and 110-2 may include one or more additional components related to the application of the device, but for simplicity, those additional components are not shown in FIG. 1. There is a connection 116 between the first device 110-1 and the second device 110-2. The connection 116 may be a wire or cable, or an optical fiber.

The network interface modules 112-1 and 112-2 shown in FIG. 1 may be configured to implement a network communication protocol according to one or more industry standards, such as specified in IEEE 802.3. To do so, the network interface modules 112-1 and 112-2 perform various signal processing operations for a PCS block and a PMA sublayer. Thus, network interface module 112-1 includes digital logic to implement a PCS block 120-1 that includes a receive function 122-1 and a transmit function 124-1. The PCS block 120-1 interacts with a PMA sublayer 126-1. The network interface module 112-1 may further include memory 130-1 that is used to execute various operations. Similarly, the network interface module 112-2 includes digital logic to implement a PCS block 120-2 that includes a receive function 122-2 and a transmit function 124-2. The PCS block 120-2 interacts with a PMA sublayer 126-2. The network interface module 112-2 may also include memory 130-2.

The network interface modules 112-1 and 112-2 may be implemented as digital logic in one or more Application Specific Integrated Circuits (ASICs) or in one or more programmable gate arrays (e.g., field programmable gate arrays) or in any combination of fixed or programmable digital processing devices now known or hereinafter developed. Moreover, the functions of the network interface modules 112-1 and 112-2 may be implemented partially or entirely as software instructions executed by a microprocessor (or several microprocessors), such as host processors 114-1 and 114-2.

According to the techniques presented herein, the transmit function of a network interface module of a given device may have the capability to be configured to use a modified PCS bit order for transmitting data that minimizes the impact of errors and thus improves FEC performance. In a simple case, the PCS block 120-1 of the network interface module 112-1 of the first device 110-1 has the capability to use the modified PCS bit ordering and the PCS block 120-2 of the network interface module 112-2 of the second device 110-2 has the capability to use the modified PCS bit ordering. In this case, the transmit function 124-1 (in the first device 110-1) is configured to use the modified PCS bit ordering and the receive function 122-2 (in the second device 110-2) is configured to use the modified PCS bit ordering (performing the inverse of the bit ordering performed by the first device 110-1), to support use of the modified bit ordering for transmissions from the first device 110-1 to the second device 110-2. Likewise, the transmit function 124-2 (in the second device 110-2) is configured to use the modified PCS bit ordering and the receive function 122-1 (in the first device 110-1) is configured to use the modified PCS bit ordering, to support the modified bit ordering transmissions from the second device 110-2 to the second device 110-1.

However, it is also possible that a given device in the field may not have the capability to be configured to use the modified PCS bit ordering. For example, the first device 110-1 may have the capability of the modified PCS bit ordering but the second device 110-2 does not have the capability of the modified PCS bit ordering. Techniques are presented herein for the first device 110-1 to learn whether or not the second device 110-2 has the modified PCS bit ordering capability, and to configure the transmit function 124-1 and receive function 122-1 according to such determination. When the first device 110-1 learns that the second device 110-2 does not have the modified PCS bit ordering capability, then the network interface module 112-1 of the first device 110-1 will configure the transmit function 124-1 to use un-modified PCS bit ordering for transmissions from the first device 110-1 to the second device 110-2, and will configure the receive function 122-1 to use un-modified PCS bit ordering for processing transmissions received from the second device 110-1. Conversely, when the first device 110-1 learns that the second device 110-2 does have the modified PCS bit ordering capability, then the network interface module 112-1 of the first device 110-1 will configure the transmit function 124-1 to use modified PCS bit ordering for transmissions from the first device 110-1 to the second device 110-2, and will configure the receive function 122-1 to use modified PCS bit ordering for processing transmissions received from the second device 110-1.

Thus, the techniques presented herein provide for leveraging the benefits of the modified PCS bit ordering when both devices on the ends of the link can use the modified PCS bit ordering, and to revert to un-modified PCS bit ordering when one device on the link cannot use the modified PCS bit ordering. A process for learning whether a far end device is configured to use the modified PCS bit ordering is described in more detail below in connection with FIG. 17.

Figure 2:
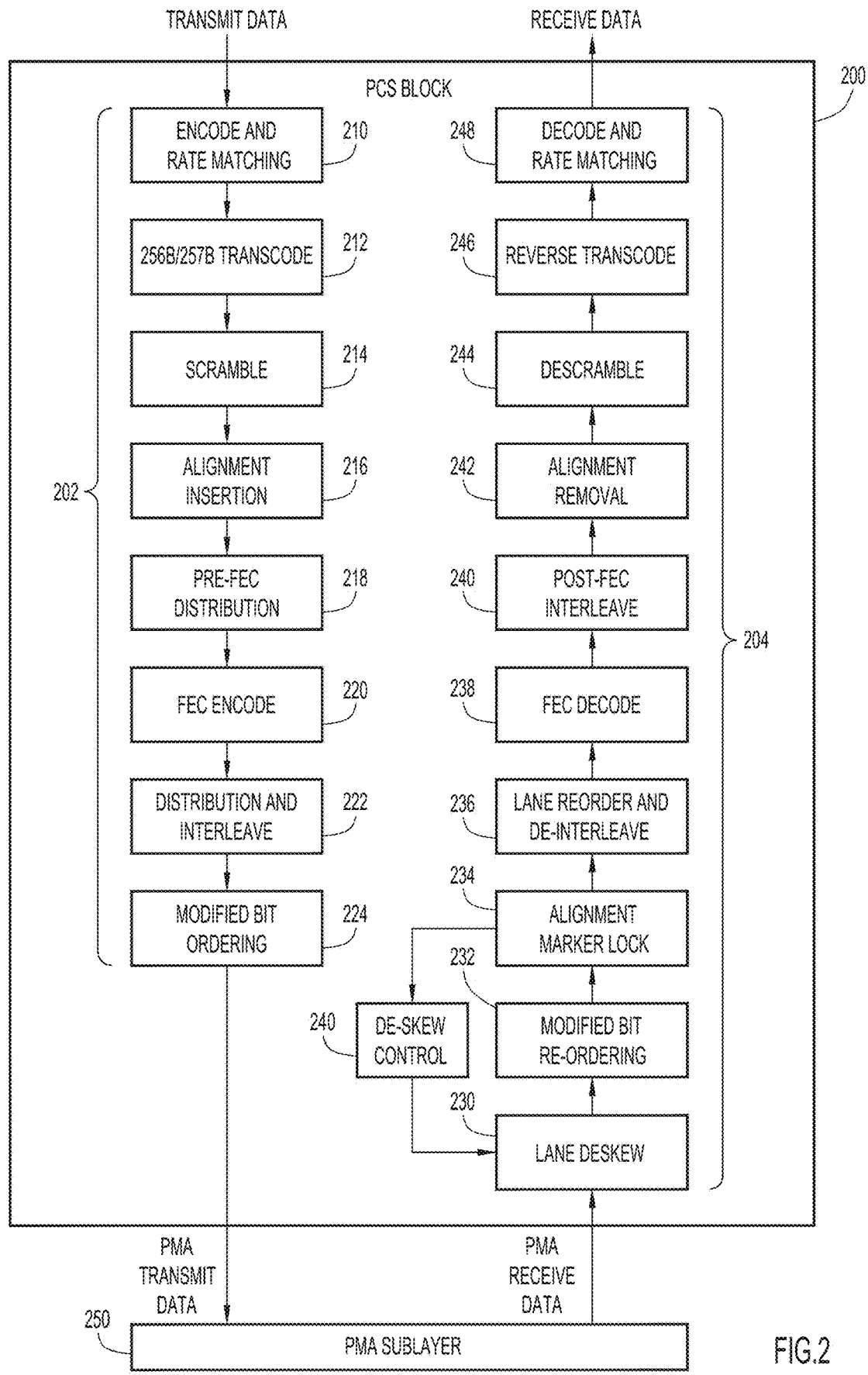
FIG. 2 is a functional block diagram of PCS block that is configured to perform the modified PCS bit order techniques presented herein, according to an example embodiment.

Turning now to FIG. 2, a functional block diagram of a PCS block 200 of the network interface modules 112-1 and 112-2 of FIG. 1 are shown. The functional block diagram of FIG. 2 is derived from the FIG. 119-2 of the IEEE 802.3 standard specification, with some modifications to explain the modified PCS bit ordering techniques presented herein. The PCS block 200 includes a sequence of operations for a transmit function (also referred to as a transmit path or transmit process) 202 of the PCS block, and a sequence of operations for a receive function (also referred to as a receive path or receive process) 204 of the PCS block 200.

The transmit function 202 includes an encode and rate matching operation 210, a transcode operation 212, a scramble operation 214, an alignment marker insertion operation 216, a pre-FEC bit distribution operation 218, an FEC encode operation 220, a distribution and interleave operation 222 and a modified bit ordering operation 224. Operations 210-222 may be, in one example, implemented in accordance with the IEEE 802.3 standard specification, or any other standard now known or hereinafter developed. The modified bit ordering operation 224 corresponds to the modified PCS bit ordering operations mentioned above and is described in more detail below in connection with FIGS. 8-14.

Similarly, the receive function 204 includes a lane deskew operation 230, a modified bit re-ordering operation 232, an alignment marker lock operation 234, a de-skew control operation 235, a lane recorder and de-interleave operation 236, an FEC decode operation 238, a post-FEC interleave operation 240, an alignment marker removal operation 242, a descramble operation 244, a reverse transcode operation 246 and a decode and rate matching operation 248. The lane deskew operation 230, modified bit re-ordering operation 232, alignment marker lock operation 234 and de-skew control operation 235, are operations performed to undo the modified PCS bit ordering in PMA receive data (if such modified PCS bit ordering was performed in transmitting data from the far end device), and are described in more detail below in connection with FIGS. 8-14. Operations 236-248 may be, in one example, implemented in accordance with the IEEE 802.3 standard specification, or any other standard now known or hereinafter developed.

The transmit function 202 of the PCS block 200 operates on transmit data and provides PMA transmit data to a PMA sublayer 250. Conversely, the PMA sublayer 250 provides PMA receive data to the receive function 204 of the PCS block 200.

The PCS block 200 provides the functions to map packets between the 200GMII/400GMII format, for example, and the PMA service interface format. When communicating with 200GMII/400GMII, as an example, the PCS block 200 uses an eight octet-wide, synchronous data path, with packet delineation provided by transmit control signals and receive control signals, not specifically shown in FIG. 2. When communicating with the PMA sublayer 250, the PCS block 200, for 200GBASE-R, uses 8 encoded bit streams (also known as PCS lanes) and for the 400GBASE-R, the PCS block 200 uses 16 encoded bit streams.

According to the techniques presented herein, no changes are made to the PMA sublayer. The re-ordering of bits among the plurality of logical lanes is performed in the PCS transmit and receive functions so that the PMA bit-muxing operation in the transmit direction to create the physical lane content, and the PMA bit de-muxing operation to provide the logical lane content in the receive direction, are not changed. The PMA operations are performed according to the existing relevant standard. A selection may be made as to whether to re-order the bits in the PCS or not, without changing the width of the interface between the PCS and the PMA sublayer, and this can be done separately in the transmit direction and in the receive direction.

Figure 3:
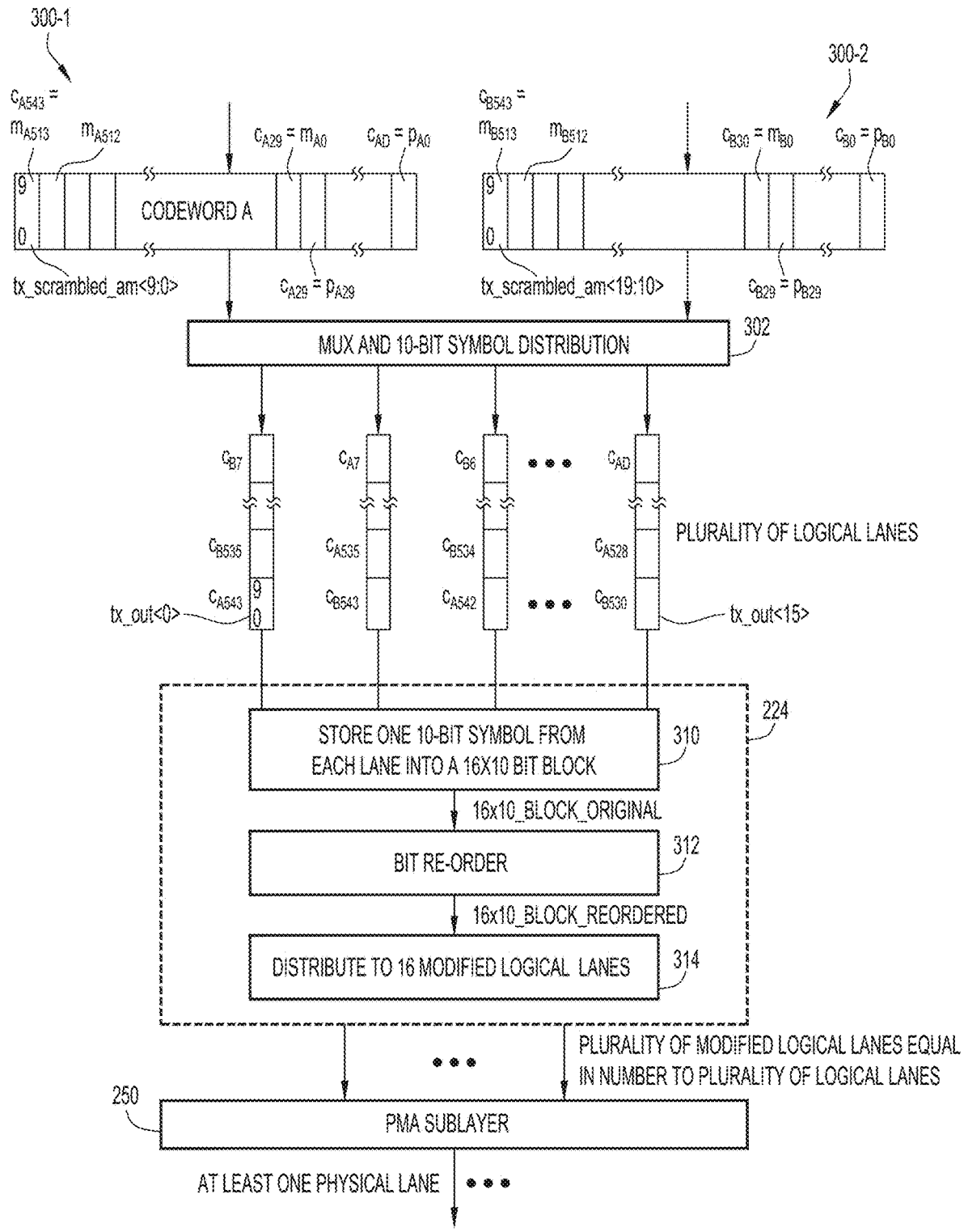
FIG. 3 is a functional diagram depicting operations of a transmit function of the PCS block to perform the modified PCS bit order techniques presented herein, according to an example embodiment.

Turning now to FIG. 3, with continued reference to FIG. 2, the modified PCS bit ordering operation 224 used in the transmit function of the PCS block 200 is now described. The modified PCS bit ordering operation 224 is performed after the FEC encode operation 220 and bit distribution and interleave operation 222. For context and as an example, the codewords output by the FEC encode operation 220 are shown at 300-1 and 300-2. The FEC encode operation 220, in accordance with IEEE 802.3, employs a Reed-Solomon FEC (RS-FEC) encoder, denoted RS(n,k), where the symbol size is 10 bits and the RS-FEC code corrects for errors in symbols. The encoder processes k message symbols to generate 2t parity symbols, which are then appended to the message to produce a codeword of n=k+2t symbols. The FEC encoder is an RS(544,514) based FEC encoder, for example. The PCS block 200 distributes a group of 40×257-bit blocks from tx scrambled am on a 10-bit round robin basis into two 5140-bit message blocks, mA and mB, as described in 119.2.4.5 of the IEEE 802.3 standard specification. These message blocks are then encoded using RS(544,514) encoder into codeword A and codeword B, respectively, and shown at reference numerals 300-1 and 300-2 in FIG. 3. The RS(544,514) code is based on the generating polynomial given by Equation (119-1) of the IEEE 802.3 standard specification for 400GBASE-R. The codeword polynomial c(x) is a sum of a message polynomial m(x) and a parity polynomial p(x), where the coefficient of the highest power of x, $c_{n-1}=m_{k-1}$ is first and the coefficient of the lowest power of x, $c_0=p_0$ is last, as defined in Equations 119-2 and 119-3 of the IEEE 802.3 standard specification.

After the data has been FEC encoded, the two FEC codewords 300-1 and 300-2 are interleaved on a 10-bit basis by multiplex and 10-bit symbol distribution operation 302 (which is a more detailed statement of the bit distribution and interleave operation 222 shown in FIG. 2). The IEEE 802.3 standard specification specifies the interleaving of two codewords for the 200GBASE-R PCS and the 400GBASE-R PCS. Taking 400GBASE-R as an example, the result of operation 302 is that 10-bit symbols are distributed to each of the logical lanes sequentially, the result of which is a plurality of logical lanes.

The modified PCS bit ordering operation 224 is now described in more detail. At step 310, bits for one 10-bit symbol is stored from each of the plurality of logical lanes (e.g., 16 logical lanes) into a block in memory, e.g., a 16×10 bit block. This is referred to as 16×10_block_original, for example. Next, a re-ordering operation 312 is performed from the stored 16×10_block_original, and the re-ordered block of bits is referred to as 16×10_block_reordered. The re-ordering operation 312 involves re-ordering bits stored in memory according to a mapping that permutes the bits stored in memory to produce a re-ordered block of bits such that when the re-ordered block of bits is distributed to a plurality of modified logical lanes equal in number to the plurality of logical lanes and the plurality of modified logical lanes are bit-multiplexed to at least one physical lane, the at least one physical lane obtains a sequence of groups of bits for a symbol from one FEC codeword followed by a sequence of groups of bits for a symbol from another FEC codeword. The "groups of bits" may be two or more bits, and in one example presented herein, the "groups of bits" is a pair (2) bits. There may be applications where higher order modulation is used, possibly using more than 2 bits at a time on a physical lane (such as QAM16 which encodes 4 bits at a time).

This re-ordering may be performed according to a mapping represented by FIGS. 8, 10 and 12, for example. In other words, the re-ordering operation 312 involves applying a mapping between one block (e.g., 16×10 block) ordering of bits and another block ordering of bits, according to the arrangement of a reordering or mapping.

At step 314, the reordered block of bits is distributed to modified logical lanes, such as 16 logical lanes. Thus, the result step 314 is a plurality of modified logical lanes that are equal in number to the plurality of logical lanes provided as input to the bit ordering operation 224, but the content of the plurality of modified logical lanes is different (insofar as the arrangement/ordering of bits). The PMA sublayer 250 operates on the content of the plurality of modified logical lanes it receives from step 314 to produce one or more physical lanes, and the PMA sublayer 250 need not be modified in any way to account for the modified bit ordering, if the modified bit ordering operation 224 is performed by the PCS transmit function. The PMA sublayer 250 operates as it normally would, according to the IEEE 802.3 specification, and the error resiliency benefits of the modified bit order are achieved in the one or more physical lanes when the modified bit ordering operation 224 is performed. If the modified bit ordering operation 224 is not performed/invoked by the PCS transmit function, then the PMA sublayer 250 operations of the plurality of logical lanes output by the bit interleave and distribution operation 222.

When the PMA sublayer 250 is configured to distribute a plurality of (more than one) physical lanes, the re-ordering operation 312 involves re-ordering bits stored in the memory according to the mapping to produce the re-ordered block of bits such that when the re-ordered block of bits is distributed to each of the plurality of modified logical lanes and the plurality of modified logical lanes are bit-multiplexed to create a plurality of physical lanes, each physical lane of the plurality of physical lanes obtains a sequence of groups of bits for a symbol from one FEC codeword followed by a sequence of groups of bits for a symbol from another FEC codeword.

Figure 4:
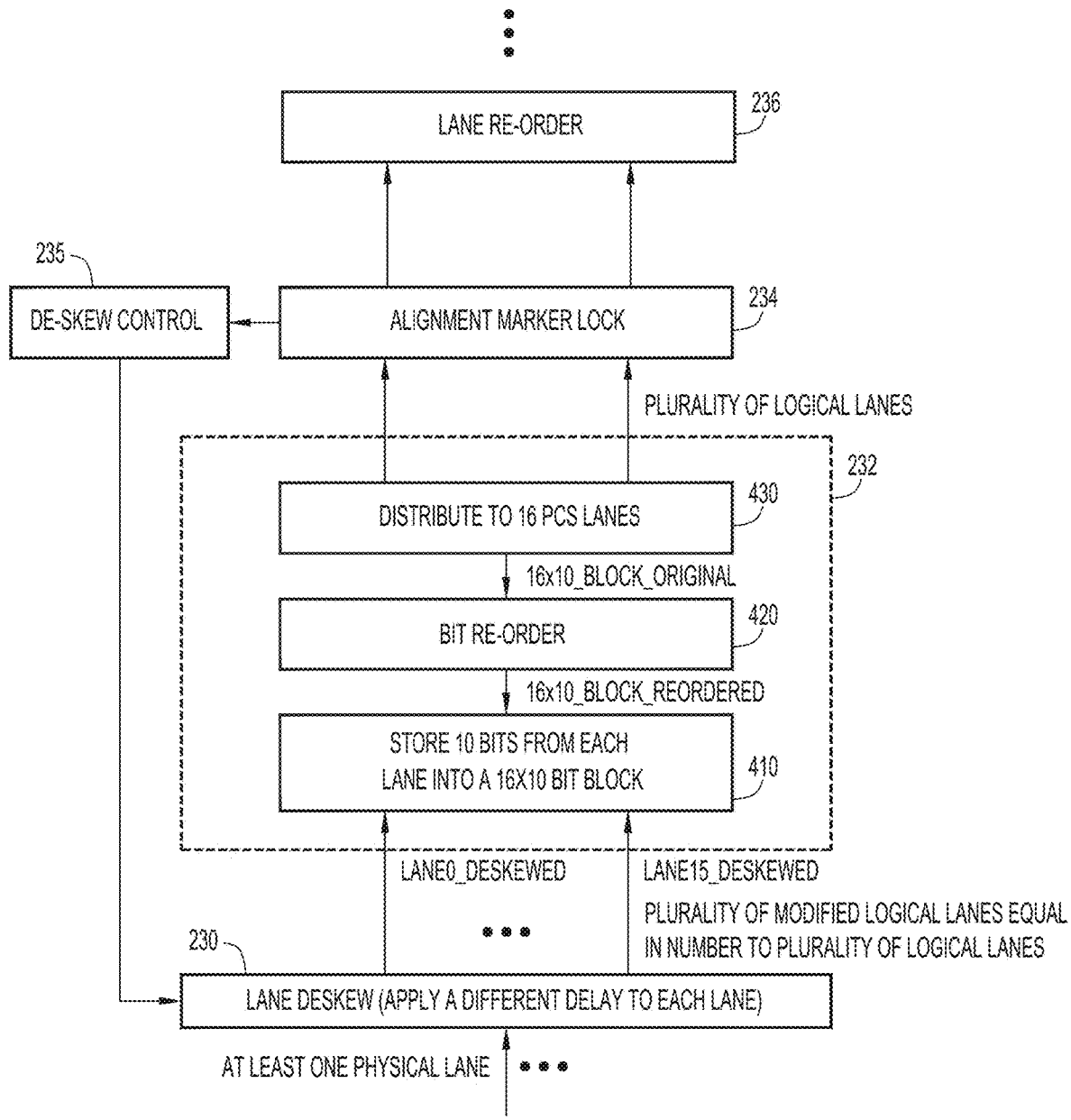
FIG. 4 is a functional diagram depicting operations of a receive function of the PCS block to perform the modified PCS bit order techniques presented herein, according to an example embodiment.

Reference is now made to FIG. 4 for a description of the PCS receive function with modified bit re-ordering for the example of the 400GBASE-R PCS. Following the paradigm of FIG. 2, the receive function processing progresses from the bottom of the page towards the top of the page. In the PCS block for handling receive bits that have not been re-ordered according to the process of FIG. 3, the de-skew control is part of the alignment lock and lane deskew operation. According to the techniques presented herein, the alignment lock and lane deskew operation is split into three separate operations: lane deskew operation 230, alignment marker lock operation 234 and de-skew control operation 235.

Figure 9:
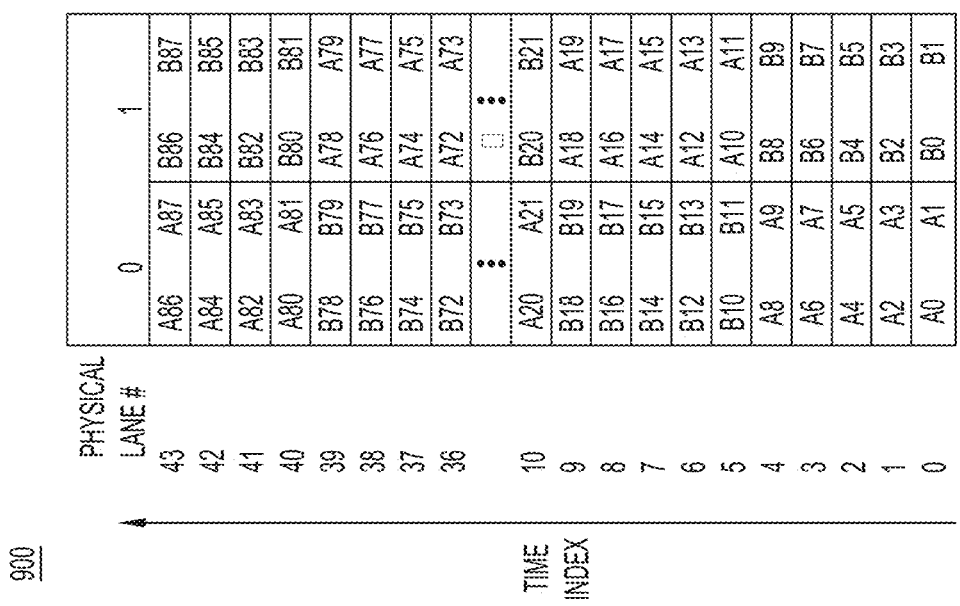
FIG. 9 illustrates a table depicting a resulting physical lane symbol order of clause 119 400GBASE-R PCS with the modified PCS bit ordering of FIG. 8 after bit-muxing to two physical lanes, according to an example embodiment.

The lane deskew operation 230 receives bits for at least one physical (PMA) lane that has been transmitted from a far end device. In the case of 400GBASE-R, there a 16 logical (PCS) lanes, but the number of physical (PMA) lanes is typically smaller, and can be as low as 2 (as depicted in FIG. 9). If the bits have been re-ordered according to the techniques of FIG. 3 at the far end device, then the output of the lane deskew operation 230 is a plurality of modified logical lanes from which the at least one physical lane has been de-multiplexed by the PMA sublayer. The plurality of modified logical lanes is equal in number to a plurality of logical lanes from which an original block of bits was re-ordered according to a mapping that permuted the original block of bits to produce a re-ordered block of bits distributed to the plurality of modified logical lanes such that when the plurality of modified logical lanes was bit-multiplexed to the at least one physical lane, the at least one physical lane contains a sequence of a groups of bits for a symbol from one FEC codeword followed by a sequence of groups of bits for a symbol from another FEC codeword.

The lane deskew operation 230 involves applying a different delay amount to the data for each physical lane (if there were multiple physical lanes) to account for different delays on the different physical lanes, to produce, for example, in the case of 16 modified logical lanes, deskewed data denoted lane0_deskewed to lane15_deskewed.

Next, as part of the modified bit-ordering operation 232, at step 410, bits (e.g., 10 bits) received for each modified logical lane are stored into a block in memory, e.g., a 16×10 bit block. The stored block of bits is referred to as 16×10_block_reordered, as an example.

At step 420, the block of bits stored in memory are re-ordered (performing the inverse or reverse of operation 312 of FIG. 3). In the other words, at step 420, an inverse of the re-ordered mapping is performed on the re-ordered block of bits stored in the memory to obtain an original block of bits. Said another way, the re-ordering step 420 is essentially the inverse of the mapping between the re-ordered block of bits and the original block ordering of bits, as depicted by a re-ordering table, such as that shown in FIG. 8.

At step 430, the original block of bits read from memory and are distributed to each of a plurality of logical lanes.

The alignment marker lock operation 234 involves detecting and locking to alignment markers inserted into the bitstream. Since the alignment markers were shuffled by the modified ordering (at the transmit side), the alignment marker lock operation 234 is performed after the inverse re-ordering is performed in order to recover the alignment markers. The output of the alignment marker lock operation 234 is provided to the lane re-order and de-interleave operation 236, and then on to the other operations of the receive function 204 of the PCS block 200, as shown in FIG. 2. In addition, the de-skew control operation 235 involves providing control input to the lane deskew operation 230 to apply an appropriate delay to the receive data for the respective physical lanes until the alignment marker lock operation 234 succeeds. As one example, the de-skew control operation 235 may perform an exhaustive search of all "lane deskew" combinations until the alignment mark lock succeeds.

Figure 5:
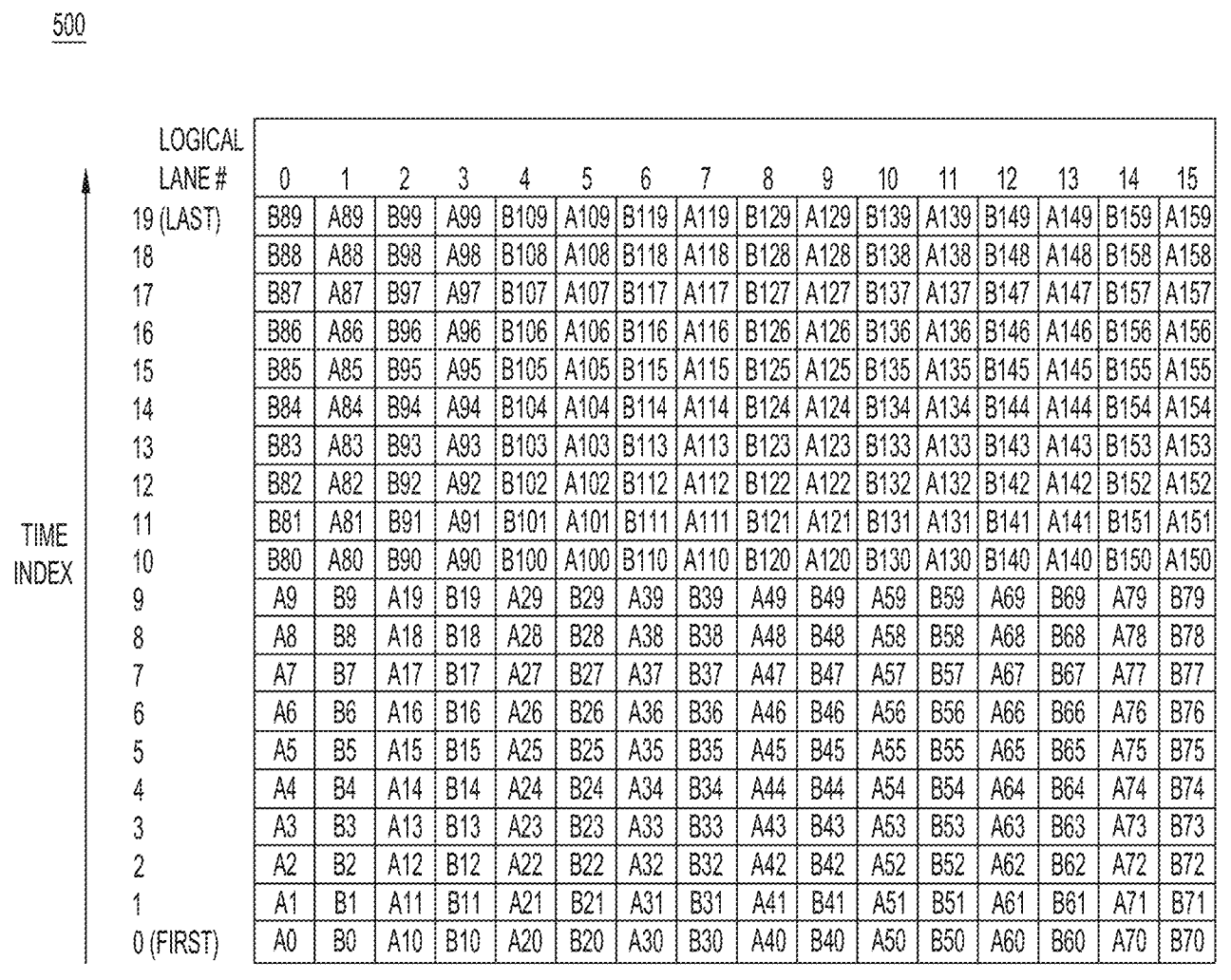

FIG. 5 shows a table 500 representing the PCS bit ordering of the existing clause 119 400GBASE-R PCS functional block or module of the IEEE 802.3 standard specification. This is representative of one of example of the aforementioned un-modified bit ordering. In FIG. 5, each column is a logical (PCS) lane (16 total). Each row represents a group of logical bits that are delivered as a group to the PMA sublayer for bitwise multiplexing. The order of generation is from bottom (early) to top (late).

The bits are labeled by the codeword they belong to (A or B, for the example where there are two codewords) and the running bit index within that codeword. 80 consecutive bits are taken from each of the two codewords, creating a block of 160 bits. The bit order within each of these blocks alternates such that each lane has 10 bits from codeword A and then 10 bits from codeword B. For example, in lane 0, 10 bits (A0-A9) from codeword A are transmitted, followed by 10 bits (B80-B89) are transmitted. Similarly, in lane 1, bits B0-B9 from codeword B are transmitted, followed by bits A80-A89. Thus, lane 1 is the mirror of lane 0 but for codeword B. This pattern repeats for consecutive lanes as shown in FIG. 5.

On transmission, the 16 logical lanes are bit-muxed to (or combined into) four physical lanes, at 100 Gb/s per lane or 400 Gb/s over 4 lanes, as shown. The physical lanes use PAM4 modulation with two bits per symbol. The resulting symbol sequences (with a particular choice of bit muxing) is shown in the table 600 of FIG. 6. Note that another bit muxing order can be applied that would result in a different physical lane symbol composition, but the effects shown below are independent of the bit muxing order.

The symbol sequences are presented in FIG. 6 by transmission order from bottom (early) to top (late). As shown in FIG. 6, the bit-muxing operation results in pairs of bits (PAM4 symbols) from different codewords to be transmitted at each time index, and every group of 2 consecutive PAM4 symbols on each lane has bits with index difference of 40±1. Since the RS-FEC code used in clause 119 has 10 bits per FEC symbol, this means that, error bursts of 2 consecutive PAM4 symbols often affect bits from two different symbols on the same codeword (e.g., A0 and A40), and occasionally error bursts of 4 consecutive PAM4 symbols can affect four different FEC symbols on the same codeword (e.g., A9, A49, A80, and A120) in rows 18, 19, 20 and 21 in FIG. 6. Thus, the performance of the code becomes sub-optimal with error bursts.

Figure 7:
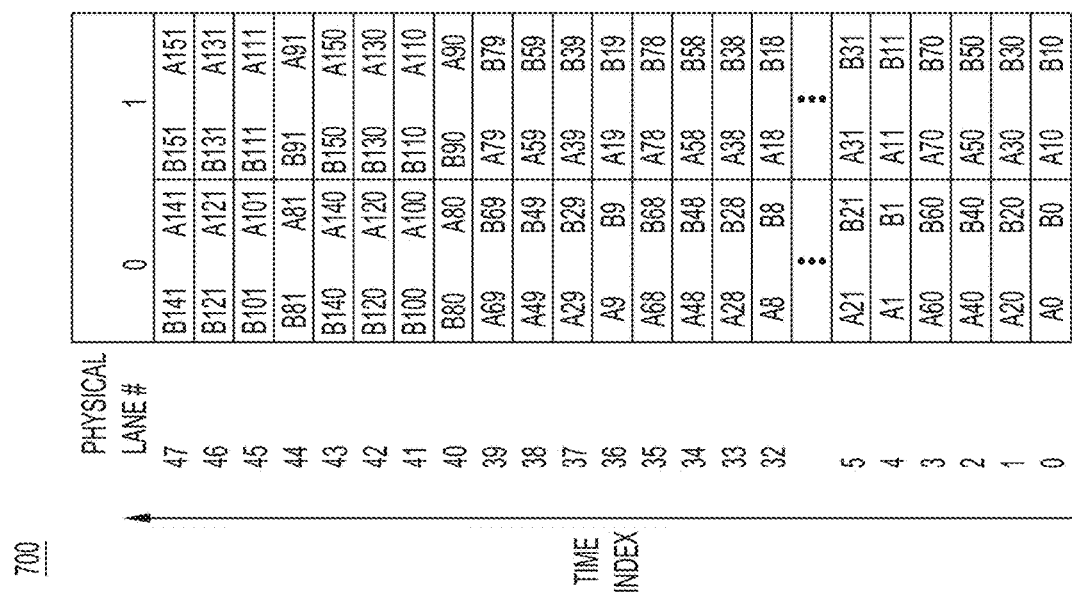
FIG. 7 illustrates a table depicting the resulting physical lane symbol ordering of existing clause 119 400GBASE-R PCS after bit-muxing to two physical lanes.

If the PCS content was bit-muxed to two physical lanes at 200 Gb/s per lane (not part of the Ethernet specification at the time of this writing, but a likely future extension), the result would be as shown by the table 700 in FIG. 7. As shown in FIG. 7, the bits in four consecutive PAM4 symbols would have index differences of 20, so error bursts of 4 consecutive PAM4 symbols would often affect four different symbols of the same codeword (e.g., A0, A20, A40, A60), and occasionally error bursts of 8 consecutive PAM4 symbols would affect eight different FEC symbols on the same codeword (e.g., A9, A29, A49, A69, A80, A100, A120, and A140) corresponding to rows 36-43. Thus, the performance of the code would be significantly degraded with error bursts. Moreover, it is understood that there is a non-negligible probability that the error burst will continue to subsequent time instances. This can consume a significant portion of the correction capability of the RS-FEC code, with a single error burst event, even when the RS-FEC code can correct up to 15 symbols per codeword.

Bit Order Modification of the Existing 400 Gb/s PCS

FIG. 8 shows a table 800 representing a mapping or modified PCS bit ordering (the aforementioned "re-ordering") presented herein for the 400 Gb/s PCS (400GBASE-R) specified in clause 119 of IEEE Std 802.3. This order is replacement of the existing PCS bit order shown in FIG. 5. The change involves re-ordering of the bits from the order shown in FIG. 5 (in every 160-bit block) to the ordering shown in FIG. 8, which is applied in both the transmitter and then the inverse of such re-ordering in the receiver. The 400GBASE-R PCS has only 2-way codeword interleaving, and this has not been changed by this modified bit ordering scheme. Thus, the table 800 shown in FIG. 8 represents how bits are re-ordered according to a mapping that permutes the bits to produce a re-ordered block of bits that is distributed to a plurality of modified logical lanes (equal in number of the plurality of logical lanes).

If the modified bit order of FIG. 8 is applied instead of the one shown in FIG. 5 and the PCS output is bit-muxed to two physical lanes at 200 Gb/s per lane (with a particular choice of bit muxing order), the result would be as shown by the table 900 in FIG. 9. Note that the choice of bit muxing order is important in this case—different muxing order could create very different symbol composition and possibly worse results.

As shown in FIG. 9, with the bit ordering modification depicted in FIG. 8, the bit-muxing operation now results in pairs of bits (PAM4 symbols) from the same codeword, and every group of 5 consecutive PAM4 symbols on each lane has 10 consecutive bits. This effectively means that symbols are transmitted on each physical lane separately and consecutively. As a result, error bursts of up to 10 consecutive PAM4 symbols will affect at most one FEC symbol on each of the two codewords. This is the best symbol ordering possible with 2-way codeword interleaving.

The re-ordering of the bits is such that, when the plurality of modified logical lanes are bit-multiplexed to at least one physical lane, the at least one physical lane obtains a sequence of groups of bits for a symbol from one FEC codeword followed by a sequence of groups of bits for a symbol from another FEC codeword.

In the example of FIG. 9 there are 2 physical lanes and each group of bits in the sequence of groups of bits is a group of two bits (i.e., a pair of bits). Thus, each physical lane is allowed a sequence of pairs of bits for a symbol from one codeword followed by a sequence of pairs of bits for a symbol for another codeword. Consider time indexes 0-4, as an example. Physical lane 0 is allowed (or assigned) a pair of bits A0-A1 at time index 0, a pair of bits A2-A3 at time index 1, a pair of bits A4-A5 at time index 2, a pair of bits A6-A7 at time index 3 and a pair of bits A8-A9 at time index 4. The forms a sequence of pairs of bits: A0-A1, A2-A3, A4-A5, A6-A7 and A8-A9, all assigned to physical lane 0 and all of these bits are for the same symbol for the same FEC codeword. This sequence of pairs of bits could be sent in any combination in any order, as long as they are all for the same symbol for a given codeword. After that sequence of pairs of bits (spanning A0-A9 for a symbol for one codeword), a sequence of pairs of bits are allocated to lane 0 from another FEC codeword, e.g., codeword B. That is, from time index 5 to time index 9, the sequence of pairs of bits are sent: B10-B11 at time index 5, B12-B13 at time index 6, B14-B15 at time index 7, B16-B17 at time index 8 and B18-B19 at time index 9. Again, this sequence of pairs of bits are for the same symbol for the same codeword, but for a different codeword that the prior sequence (spanning time indices 0-4). This pattern repeats in lane 0.

A similar bit allocation/assignment is made by the re-ordering scheme for lane 1. At time indices 0-4, a sequence of pairs of bits (bits B0-B9) for a symbol from codeword B are assigned, and then a sequence of pairs of bits (bits A10-A19) for a symbol from codeword A are assigned.

Thus, in the example the bit re-ordering techniques depicted by FIGS. 8 and 9, the number of the plurality of FEC codewords is two FEC codewords, and the sequence of groups of bits alternates, over time for symbols between the two FEC codewords. Moreover, FIGS. 8 and 9 depict an example in which the number of the plurality of modified logical lanes is 16 and the number of physical lanes is 2.

Modification of the Existing 200 Gb/s PCS

A 200GBASE-R PCS (similar to 400GBASE-R but with 8 logical lanes) has the same issues when its output is bit-muxed. A similar bit order modification (depicted by table 1000 in FIG. 10) can be applied to the PCS for transmission on one physical lane (at 200 Gb/s).

Figure 11:
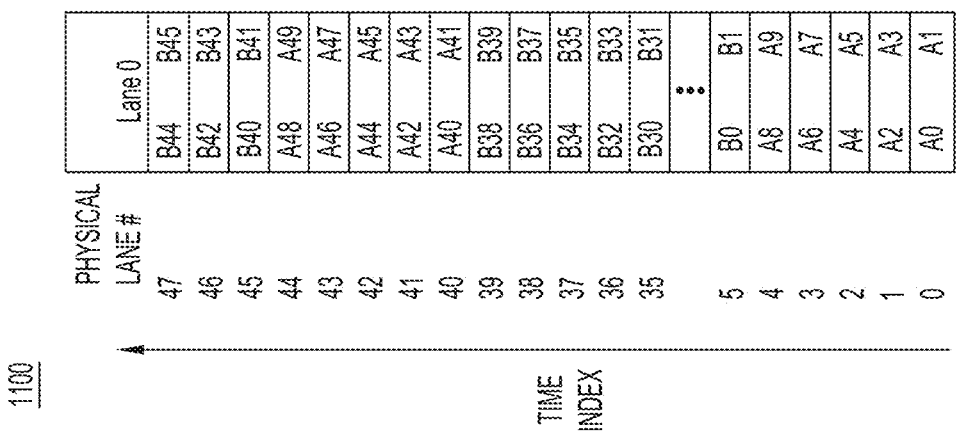
FIG. 11 illustrates a table depicting a resulting physical lane symbol order of clause 119 200GBASE-R PCS with modified PCS bit ordering of FIG. 10 after bit-muxing to one physical lane, according to an example embodiment.

The resulting symbol order mapped to a single physical lane is shown by table 1100 in FIG. 11. As in the modified 400GBASE-R, error bursts of up to 10 consecutive PAM4 symbols will affect at most one FEC symbol on each of the two codewords. This is the best symbol ordering possible with 2-way codeword interleaving.

FIGS. 10 and 11 depict an example of the bit re-ordering techniques in which the number of the plurality of modified logical lanes is 8 and the number of physical lanes is one.

Modified Bit Order for the Future 800 Gb/s PCS

Figure 12B:
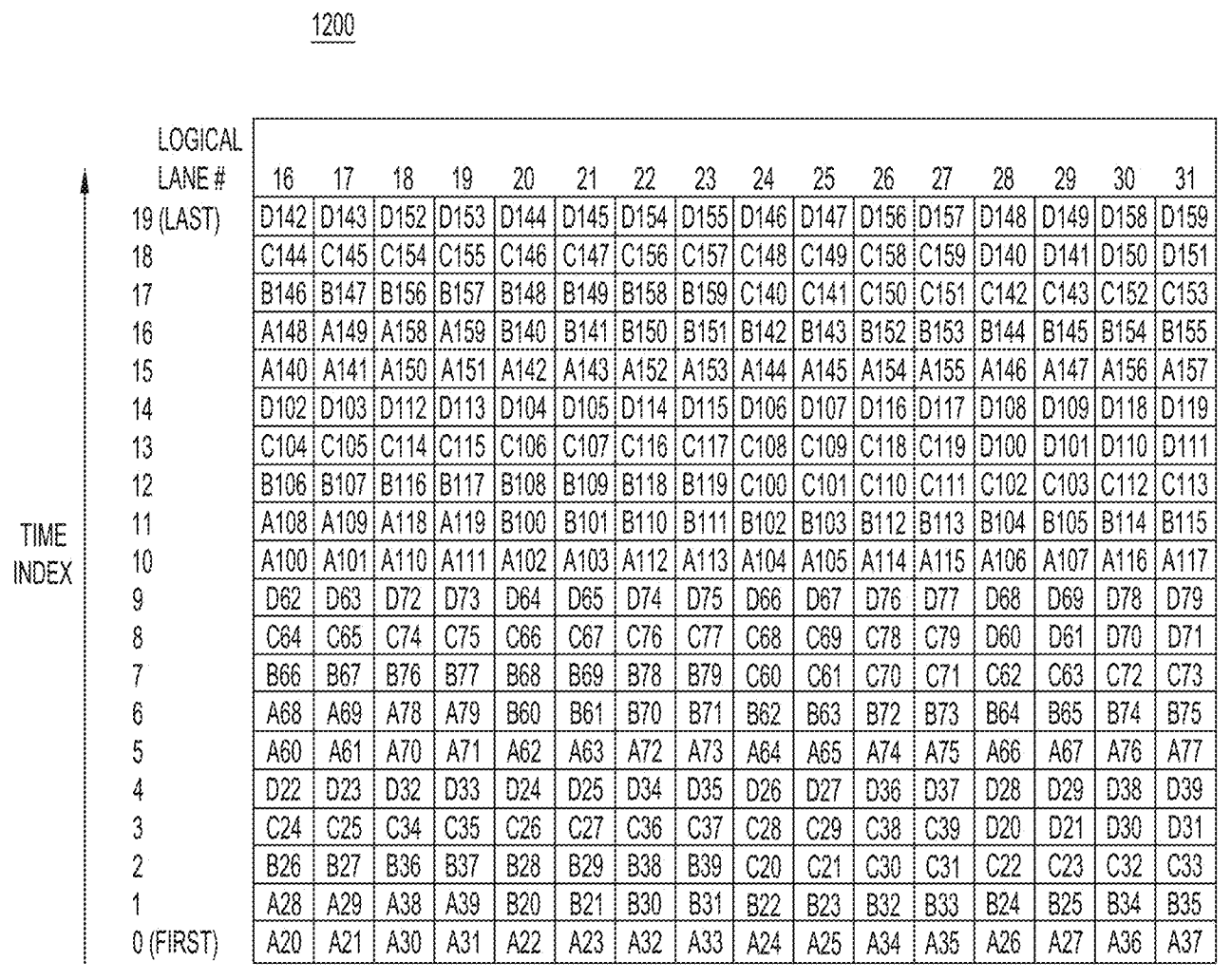

The PCS bit order modification techniques described above can be applied to future more sophisticated and higher bandwidth schemes. For example, table 1200 in FIGS. 12A and 12B shows a modified PCS bit ordering for the 800 Gb/s PCS (800GBASE-R) that is being specified in IEEE P802.3df. Each column is a logical lane (32 total across FIGS. 12A and 12B). Each row represents a group of logical bits that are delivered as a group to the PMA for bitwise multiplexing. The order of generation is from bottom (early) to top (late).

The bits are labeled by the FEC codeword they belong to (A, B, C, or D) and the running bit index within that codeword. 20 consecutive bits are taken from each of the four codewords, creating a block of 80 bits. The bit order within each of these blocks is the same. Two such groups are generated in parallel as shown, one on logical lanes 0 through 15 (left), and the other on logical lanes 16 through 31 (right).

On transmission, the 32 logical lanes are bit-muxed to four physical lanes, at 200 Gb/s per lane. The physical lanes use PAM4 modulation with two bits per symbol. The resulting symbol sequences (with a particular choice of bit muxing order) is shown by table 1300 in FIG. 13. Note that the choice of bit muxing is important in this case—different muxing order could create very different symbol composition and possibly worse results.

The symbol sequences appear in FIG. 13 by transmission order from bottom (early) to top (late). As can be seen, the bit-muxing operation results in pairs of bits (PAM4 symbols) from the same codeword, and every group of 5 consecutive PAM4 symbols on each lane has 10 consecutive bits. Moreover, each physical lane obtains a sequence of pairs of bits for a symbol from one FEC codeword followed by a sequence of pairs of bits from another FEC codeword. For example, for physical lane 0, the sequence of pairs of bits assigned is: A0-A1 at time index 0, A2-A3 at time index 1, A4-A5 at time index 2, A6-A7 at time index 3, and A8-A9 at time index 4. Bits A0-A9 are from the same symbol of FEC codeword A. This is followed by on physical lane 0, a sequence of pairs of bits from bits B0-B9, which are from the same symbol of FEC codeword B. This is followed by, on physical lane 0 a sequence of pairs of bits from bits C0-C9, which are from the same symbol of FEC codeword C. This in turn is followed by, on physical lane 0, a sequence of pairs of bits from bits D0-D9, which are from the same symbol of FEC codeword D. A similar pattern occurs for physical lane 1, starting with a sequence of pairs of bits A10-A11, A12-A13, A14-A15, A16-A17, and A18-A19, which are from the same symbol for FEC codeword A; followed by a sequence of pairs of bits B10-B11, B12-B13, B14-B15, B18-B19, which are from the same symbol for FEC codeword B, and so on. A similar pattern also occurs for physical lane 2 and physical lane 3. Again, the pairs of bits of a sequence can be in any order and the bits of a pair can be in any order. Thus, FIGS. 12A and 12B depicts an example of the re-ordering techniques when the number of the plurality of FEC codewords is four FEC codewords, and the sequence of groups of bits alternates, over time, for symbols between the four FEC codewords.

Since the RS-FEC code using in clause 119 has 10 bits per FEC symbol, this effectively means that symbols are transmitted on each physical lane separately and consecutively. As a result, error bursts of up to 20 consecutive PAM4 symbols will affect at most one FEC symbol on each of the four codewords.

FIG. 14 shows a table 1400 depicting the resulting symbol order when bit-muxing to eight physical lanes (100 Gb/s each) instead of to four physical lanes. As can be seen, the PAM4 symbols on each lane are still composed of bits from the same FEC codeword and symbol, but FEC symbols are spread across two physical lanes; for example, bits A0 through A9 are spread across lanes 0 and 2. Moreover, the pattern of a sequence of pairs of bits from one codeword followed by a sequence of pairs of bits for another codeword is followed for each physical lane. For example, for physical lane 0, the sequence of pairs of bits is: A0-A1 at time index 0, A4-A5 at time index 1, and A8-A9 at time index 2. All of these bits (A0, A1, A4, A5, A8 and A9) are from the same symbol of FEC codeword A. This is followed by the sequence of pairs of bits: B2-B3 at time index 3, B6-B7 at time index 4, and all of these bits are from the same symbol of FEC codeword B. This is followed by the sequence of pairs of bits: C0-CI at time index 7, C4-05 at time index 6, and C8-C9 at time index 7, and all of these bits are from the same symbol for FEC codeword C. This is followed by the sequence of pairs of bits: D2-D3 at time index 8 and D6-D7 at time index 9, and all of these bits are from the same symbol for codeword D. The pattern then starts again with a sequence of pairs of bits for a given symbol of FEC codeword A, etc. The same sort of pattern is used for physical lanes 1-7. As a result, error bursts of length up to 10 (instead of 20 above) consecutive PAM4 symbols will affect at most one FEC symbol on each of the four codewords. This is better than the existing 400GBASE-R PCS even at 100 Gb/s per lane.

Thus, in the example of FIGS. 12-14, the number of the plurality of modified logical lanes is 32 and the number of the plurality of physical lanes is 4 (in FIG. 13) or 8 (in FIG. 14).

Switching between the new bit order and the existing bit order is possible with very small logic implementation. As a result, it is possible to implement both bit the modified bit ordering and un-modified bit ordering, and implement backward comparability with a simple detection mechanism. A device starts transmitting with the new bit order, and on its receiver, it attempts to decode the FEC with that order. If many errors are found, the device can try decoding using the "old" bit order. If it succeeds, it means that the link partner is not using the modified order, and the device switches its transmit bit order to the old order as well. A process for determining and adjusting a configuration of one device based on the capability learned for another device is described below in connection with FIG. 17.

The effect of the physical lane symbol composition on FEC performance, in terms of coding gain (or the desired SNR to achieve a given codeword error ratio), can be analyzed rigorously (as has been done in past work, e.g. in IEEE contributions anslow_3ck_adhoc_01_041019, anslow_3ck_adhoc_01_072518, and anslow_01_0815_logic), but such analysis is beyond the scope of this document. Nonetheless, it is apparent from inspection of FIGS. 8-14, that the modified PCS bit ordering (the bit re-ordering) always makes error bursts affect fewer FEC symbols than with the PCS bit order presented the original clause 119 of the IEEE 802.3 standard specification, with a significant difference for long bursts. Thus, it is apparent from such inspection that the modified order improves the coding gain. The effect of the modified bit order is similar to the result with no error bursts at all. In that case, the coding gain would be improved by 0.5 to 1 dB.

Figure 15:
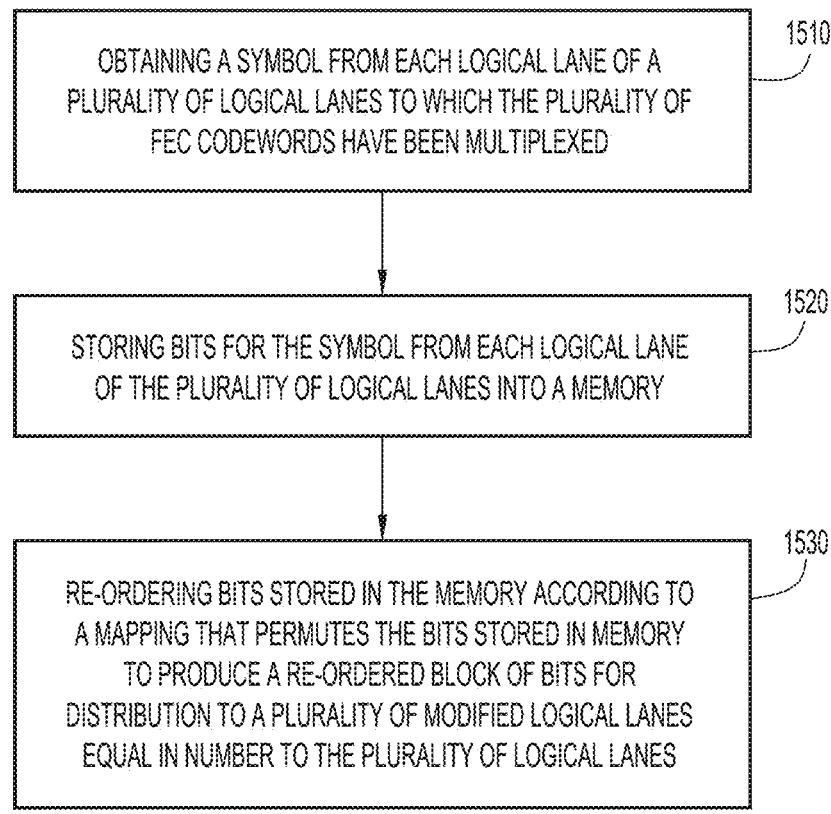
FIG. 15 is a flow chart of a method performed at one device when transmitting data to another device, according to an example embodiment.

Reference is now made to FIG. 15, which illustrates a flow chart depicting a method 1500 performed at one device when transmitting data to another device, according to the techniques presented herein. The method 1500 involves, for each FEC codeword of a plurality of FEC codewords of data to be transmitted over a channel, at step 1510, obtaining a symbol from each logical lane of a plurality of logical lanes to which the plurality of FEC codewords have been multiplexed. At step 1520, the method 1500 includes storing bits for the symbol from each logical lane of the plurality of logical lanes into a memory. At step 1530, the method 1500 includes re-ordering bits stored in the memory according to a mapping that permutes the bits stored in memory to produce a re-ordered block of bits such that when the re-ordered block of bits is distributed to a plurality of modified logical lanes equal in number to the plurality of logical lanes and the plurality of modified logical lanes are bit-multiplexed to at least one physical lane, the at least one physical lane obtains a sequence of groups of bits for a symbol from one FEC codeword followed by a sequence of groups of bits for a symbol from another FEC codeword.

Figure 16:
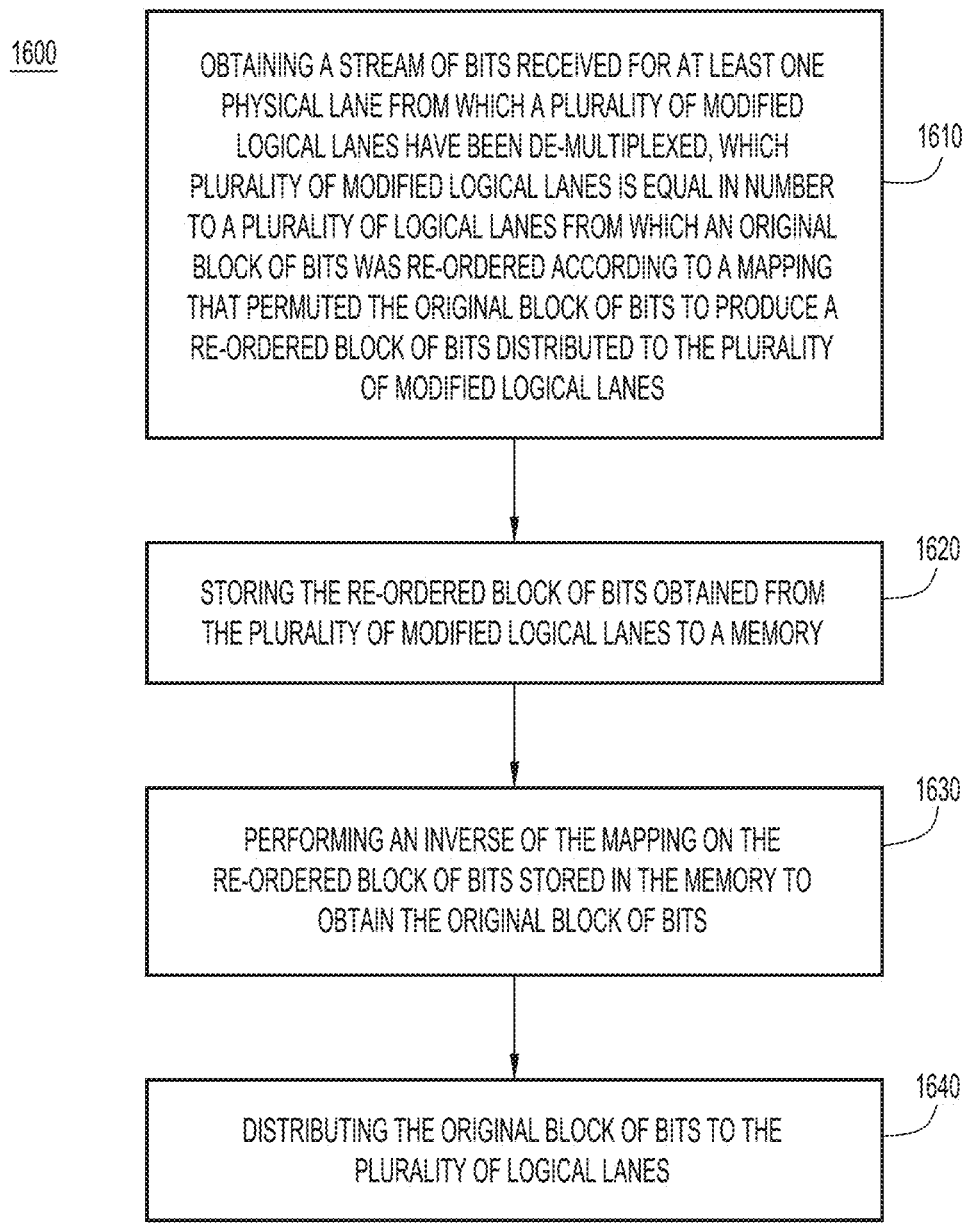
FIG. 16 is a flow chart of a method performed at one device when receiving data transmitted by another device, according to an example embodiment.

FIG. 16 illustrates a flow chart depicting a method 1600 performed at one device when receiving data transmitted from another device, according to the techniques presented herein. The method 1600 includes, at step 1610, obtaining a stream of bits received for at least one physical lane from which a plurality of modified logical lanes have been de-multiplexed, which plurality of modified logical lanes is equal in number to a plurality of logical lanes from which an original block of bits was re-ordered according to a mapping that permuted the original block of bits to produce a re-ordered block of bits distributed to the plurality of modified logical lanes such that when the plurality of modified logical lanes was bit-multiplexed to the at least one physical lane, the at least one physical lane contains a sequence of a groups of bits for a symbol from one FEC codeword followed by a sequence of groups of bits for a symbol from another FEC codeword. At step 1620, the method 1600 includes storing the re-ordered block of bits obtained from the plurality of modified logical lanes to a memory. At step 1630, the method 1600 includes performing an inverse of the mapping on the re-ordered block of bits stored in the memory to obtain the original block of bits. At step 1640, the method 1600 includes distributing the original block of bits to the plurality of logical lanes.

In summary, the techniques presented herein maximize the performance of the RS-FEC code, for 200 Gb/s per lane signaling. As a result, the probability of having uncorrectable codewords (data loss) on a given link is reduced by several orders of magnitude. Alternatively, the link performance can be met with longer channels and/or lower Serializer-Deserializer (SerDes) power.

Figure 17:
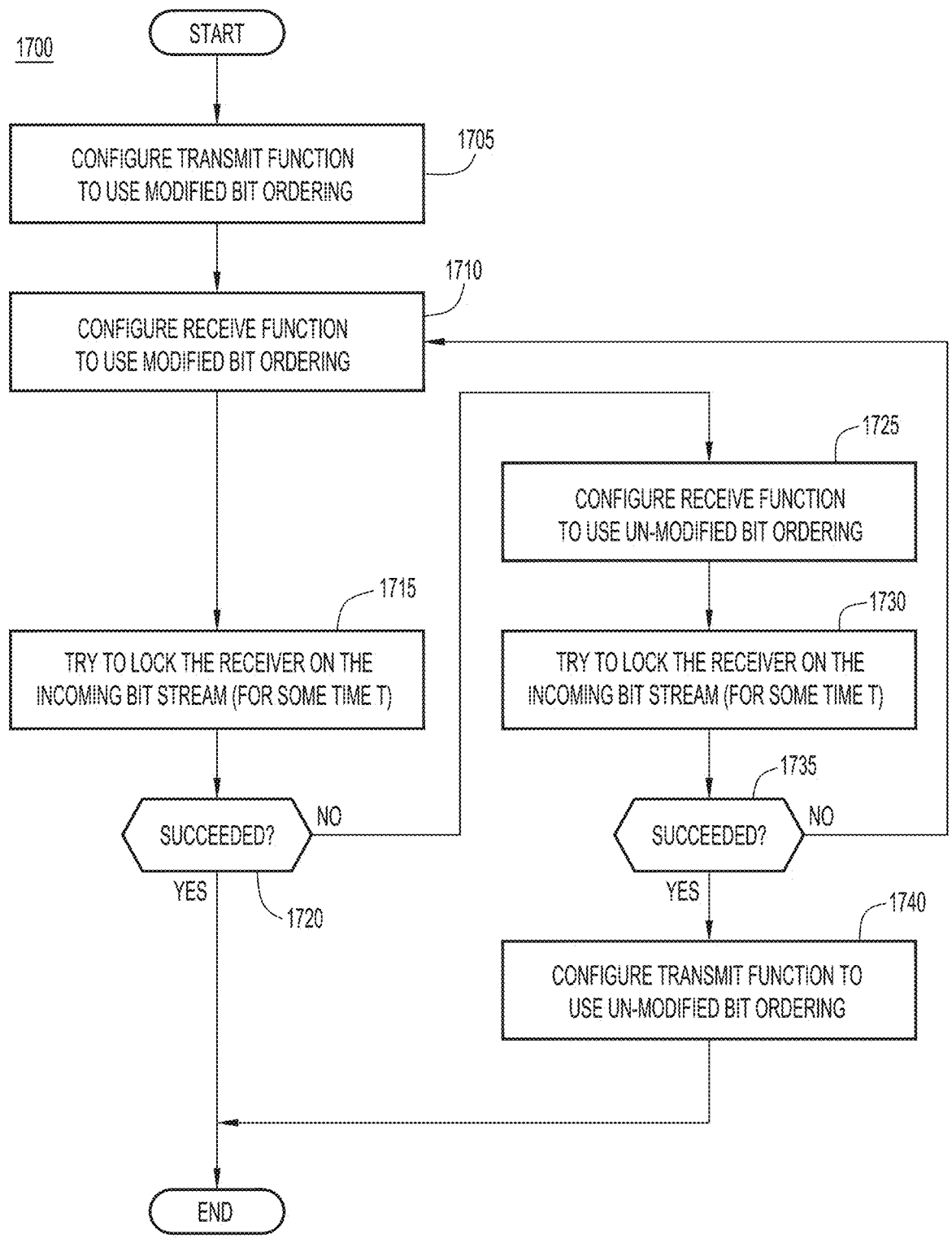
FIG. 17 is a flow chart depicting a method by which a device may learn the PCS bit ordering capabilities of another device, according to an example embodiment.

Reference is now made to FIG. 17. FIG. 17 is a flow chart depicting a method 1700 performed at a device, e.g., a first device, when conducting network communications with a second device. Reference is also made to FIG. 1 for purposes of the description of method 1700. At step 1705, the method 1700 involves configuring a transmit function, e.g., a PCS transmit function, to use a modified bit ordering that maps bits from a plurality of logical lanes to a plurality of modified logical lanes that are bit-multiplexed to at least one physical lane for transmission to a second device. At step 1710, the method 1700 involves configuring a receive function (e.g., a PCS receive function) to use a modified bit ordering for processing a stream of bits received from the second device on at least one physical lane from which a plurality of modified logical lanes have been de-multiplexed, the plurality of modified logical lanes being equal in number to a plurality of logical lanes from which an original block of bits was re-ordered according to the modified bit ordering.

Next, at step 1715, the receive function of the first device attempts to process (lock to) an incoming bit stream received from the second device (for some period of time T). At step 1720, if the attempt to process (lock to) the incoming bit stream with the receive function using the modified bit ordering is successful, then the method 1700 ends. The first device can thereafter continue to use the modified bit ordering with the receive function for processing transmissions received from the second device, and can continue to use the modified bit ordering with the transmit function for making transmissions to the second device. In other words, through steps 1705, 1710, 1715 and 1720, the first device has learned that the second device is also capable of using the modified (PCS) bit ordering (the aforementioned reordering) since it was able to successfully process a received transmission from the second device using the modified (PCS) bit ordering.

On the other hand, if the first device is not successful in processing (locking to) a receive transmission from the second device using the modified bit ordering, then the method 1700 proceeds to step 1725 where the first device configures its (PCS) receive function to use an un-modified bit ordering. Next, at step 1730, the first device tries to process (lock to) a received incoming bit stream from the second device (for some time T) using the un-modified bit ordering.

At step 1735, it is determined whether the first device is successful in processing (locking to) a received incoming bit pattern using the un-modified bit ordering. If successful, then at step 1740, the first device configures the (PCS) transmit function to use the un-modified bit ordering for transmissions to the second device. If not successful at step 1735, then the process reverts to step 1710 and steps 1715 and 1720 are repeated.

Figure 18:
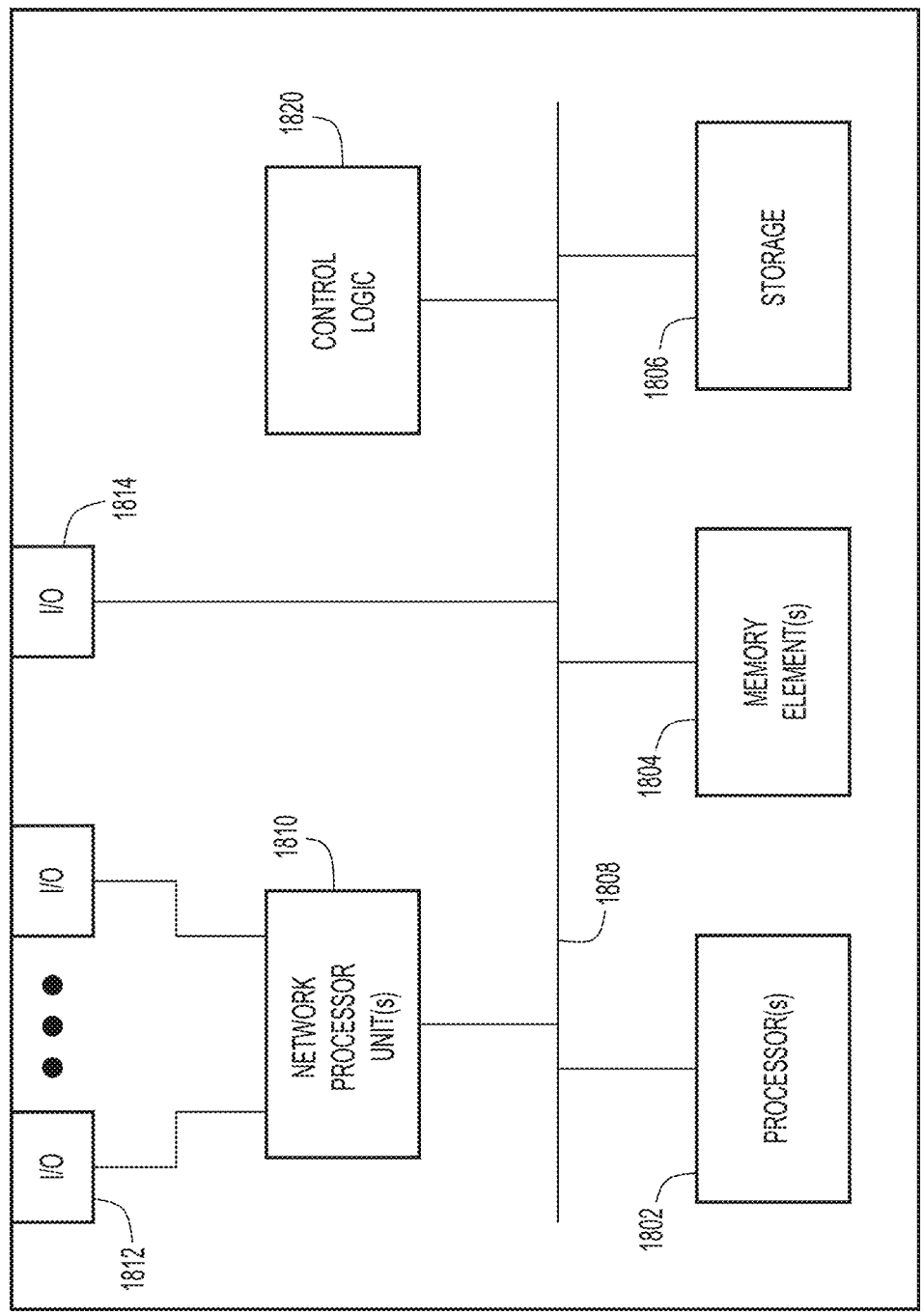
FIG. 18 is a block diagram of a device that may be configured to perform the operations presented herein.

Referring now to FIG. 18, a hardware block diagram is shown of a device 1800 that may perform functions associated with operations discussed herein in connection with the techniques presented herein. In various embodiments, the device 1800 may be a networking device, a computing device or any device that may be configured to perform networking communications using the techniques presented herein.

In at least one embodiment, the device 1800 may be any apparatus that may include one or more processor(s) 1802, one or more memory element(s) 1804, storage 1806, a bus 1808, one or more network processor unit(s) 1810 interconnected with one or more network input/output (I/O) interface(s) 1812, one or more I/O interface(s) 1814, and control logic 1820. In various embodiments, instructions associated with logic for device 1800 can overlap in any manner and are not limited to the specific allocation of instructions and/or operations described herein.

In at least one embodiment, processor(s) 1802 is/are at least one hardware processor configured to execute various tasks, operations and/or functions for device 1800 as described herein according to software and/or instructions configured for device 1800. Processor(s) 1802 (e.g., a hardware processor) can execute any type of instructions associated with data to achieve the operations detailed herein. In one example, processor(s) 1802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1804 and/or storage 1806 is/are configured to store data, information, software, and/or instructions associated with device 1800, and/or logic configured for memory element(s) 1804 and/or storage 1806. For example, any logic described herein (e.g., control logic 1820) can, in various embodiments, be stored for device 1800 using any combination of memory element(s) 1804 and/or storage 1806. Note that in some embodiments, storage 1806 can be consolidated with memory element(s) 1804 (or vice versa), or can overlap/exist in any other suitable manner.

In one form, the operations of the transmit function described herein may be embodied in an apparatus that includes a memory; and one or more integrated circuits configured with digital logic, or a processor device configured with instructions, to perform operations including: for each forward error corrected (FEC) codeword of a plurality of FEC codewords of data to be transmitted over a channel, obtaining a symbol from each logical lane of a plurality of logical lanes to which the plurality of FEC codewords have been multiplexed; storing in the memory bits for the symbol from each logical lane of the plurality of logical lanes; and re-ordering bits stored in the memory according to a mapping that permutes the bits stored in memory to produce a re-ordered block of bits such that when the re-ordered block of bits is distributed to a plurality of modified logical lanes equal in number to the plurality of logical lanes and the plurality of modified logical lanes are bit-multiplexed to at least one physical lane, the at least one physical lane obtains a sequence of groups of bits for a symbol from one FEC codeword followed by a sequence of groups of bits for a symbol from another FEC codeword.

Similarly, the operations of the receive function described herein may be embodied in an apparatus that includes a memory; and one or more integrated circuits configured with digital logic, or a processor device configured with instructions, to perform operations including: obtaining a stream of bits received for at least one physical lane from which a plurality of modified logical lanes have been de-multiplexed, which plurality of modified logical lanes is equal in number to a plurality of logical lanes from which an original block of bits was re-ordered according to a mapping that permuted the original block of bits to produce a re-ordered block of bits distributed to the plurality of modified logical lanes such that when the plurality of modified logical lanes was bit-multiplexed to the at least one physical lane, the at least one physical lane contains a sequence of a groups of bits for a symbol from one forward error corrected (FEC) codeword followed by a sequence of groups of bits for a symbol from another FEC codeword; storing the re-ordered block of bits obtained from the plurality of modified logical lanes to a memory; performing an inverse of the mapping on the re-ordered block of bits stored in the memory to obtain the original block of bits; and distributing the original block of bits to the plurality of logical lanes.

In at least one embodiment, bus 1808 can be configured as an interface that enables one or more elements of device 1800 to communicate in order to exchange information and/or data. Bus 1808 can be implemented with any architecture designed for passing control, data and/or information between processors, memory elements/storage, peripheral devices, and/or any other hardware and/or software components that may be configured for device 1800. In at least one embodiment, bus 1808 may be implemented as a fast kernel-hosted interconnect, potentially using shared memory between processes (e.g., logic), which can enable efficient communication paths between the processes.

In various embodiments, network processor unit(s) 1810 may enable communication between device 1800 and other systems, entities, etc., via network I/O interface(s) 1812 (wired and/or wireless, e.g., ports or interfaces) to facilitate operations discussed for various embodiments described herein. In various embodiments, network processor unit(s) 1810 can be configured to perform the network communication techniques presented herein as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1800 and other systems, entities, etc. to facilitate operations for various embodiments described herein. In various embodiments, network I/O interface(s) 1812 can be configured as one or more Ethernet port(s), Fibre Channel ports, any other I/O port(s), and/or antenna(s)/antenna array(s) now known or hereafter developed. Thus, the network processor unit(s) 1810 and/or network I/O interface(s) 1812 may include suitable interfaces for receiving, transmitting, and/or otherwise communicating data and/or information in a network environment.

I/O interface(s) 1814 allow for input and output of data and/or information with other entities that may be connected to device 1800. For example, I/O interface(s) 1814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1820 can include instructions that, when executed, cause processor(s) 1802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1804 and/or storage 1806 can store data, software, code, instructions (e.g., processor instructions), logic, parameters, combinations thereof, and/or the like used for operations described herein. This includes memory element(s) 1804 and/or storage 1806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

In some aspects, the techniques described herein relate to a method including: for each forward error corrected (FEC) codeword of a plurality of FEC codewords of data to be transmitted over a channel, obtaining a symbol from each logical lane of a plurality of logical lanes to which the plurality of FEC codewords have been multiplexed; storing bits for the symbol from each logical lane of the plurality of logical lanes into a memory; and re-ordering bits stored in the memory according to a mapping that permutes the bits stored in memory to produce a re-ordered block of bits such that when the re-ordered block of bits is distributed to a plurality of modified logical lanes equal in number to the plurality of logical lanes and the plurality of modified logical lanes are bit-multiplexed to at least one physical lane, the at least one physical lane obtains a sequence of groups of bits for a symbol from one FEC codeword followed by a sequence of groups of bits for a symbol from another FEC codeword.

In some aspects, the re-ordering includes re-ordering bits stored in the memory according to the mapping to produce the re-ordered block of bits such that when the re-ordered block of bits is distributed to each of the plurality of modified logical lanes and the plurality of modified logical lanes are bit-multiplexed to create a plurality of physical lanes, each physical lane of the plurality of physical lanes obtains a sequence of groups of bits for a symbol from one FEC codeword followed by a sequence of groups of bits for a symbol from another FEC codeword.

In some aspects, the sequence of groups of bits are for the same symbol for an FEC codeword.

In some aspects, a number of the plurality of FEC codewords is two FEC codewords, and the sequence of groups of bits alternates, over time, for symbols between the two FEC codewords. In some aspects, the number of the plurality of modified logical lanes is 16 and the number of physical lanes is 2, or the number of the plurality of modified logical lanes is 8 and the number of physical lanes is one.

In some aspects, a number of the plurality of FEC codewords is four FEC codewords, and the sequence of groups of bits alternates, over time, for symbols between the four FEC codewords. In some aspects, the number of the plurality of modified logical lanes is 32 and the number of the plurality of physical lanes is 4 or 8.

In some aspects, the bits in each sequence of groups of bits are in any order for a symbol for an FEC codeword.

In some aspects, each group in the sequence of groups is two or more bits.

In some aspects, the techniques described herein relate to a method including: obtaining a stream of bits received for at least one physical lane from which a plurality of modified logical lanes have been de-multiplexed, which plurality of modified logical lanes is equal in number to a plurality of logical lanes from which an original block of bits was re-ordered according to a mapping that permuted the original block of bits to produce a re-ordered block of bits distributed to the plurality of modified logical lanes such that when the plurality of modified logical lanes was bit-multiplexed to the at least one physical lane, the at least one physical lane contains a sequence of a groups of bits for a symbol from one forward error corrected (FEC) codeword followed by a sequence of groups of bits for a symbol from another FEC codeword; storing the re-ordered block of bits obtained from the plurality of modified logical lanes to a memory; performing an inverse of the mapping on the re-ordered block of bits stored in the memory to obtain the original block of bits; and distributing the original block of bits to the plurality of logical lanes.

In some aspects, the obtaining includes obtaining streams of bits received for each of a plurality of physical lanes from which the plurality of modified logical lanes have been de-multiplexed.

In some aspects, the method further includes: prior to storing, deskewing the streams of bits of the plurality of physical lanes. In some aspects, the method further includes: determining an alignment marker for bits of the plurality of logical lanes; and adjusting the deskewing until alignment marker lock is successful.

In some aspects, each group in the sequence of groups is two or more bits.

In some aspects, the techniques described herein relate to a method performed by a first device that is in communication with a second device, including: configuring a transmit function to use a modified bit ordering that maps bits from a plurality of logical lanes to a plurality of modified logical lanes that are bit-multiplexed to at least one physical lane for transmission to a second device; configuring a receive function to use a modified bit ordering for processing a stream of bits received from the second device on at least one physical lane from which a plurality of modified logical lanes have been de-multiplexed, the plurality of modified logical lanes being equal in number to a plurality of logical lanes from which an original block of bits was re-ordered according to the modified bit ordering; receiving an incoming bit stream from the second device; attempting to process the incoming bit stream from the second device with the receive function using the modified bit ordering; and when processing the incoming bit stream using the modified bit ordering is not successful, configuring the receive function of the first device to use an un-modified bit ordering for processing the incoming bit stream from the second device.

In some aspects, the techniques described herein relate to a method, further including: attempting to process the incoming bit stream with the receive function using the un-modified bit ordering; and when processing the incoming bit stream using the un-modified bit ordering is successful, configuring the transmit function to use the un-modified bit ordering for transmissions to the second device.

In some aspects, the techniques described herein relate to a method, when processing the incoming bit stream using the modified bit ordering is successful, continuing to use the modified bit ordering with the receive function for processing transmissions received from the second device.

In some aspects, an apparatus is provided including: a memory; and one or more integrated circuits configured with digital logic, or a processor device configured with instructions, to perform operations including: for each forward error corrected (FEC) codeword of a plurality of FEC codewords of data to be transmitted over a channel, obtaining a symbol from each logical lane of a plurality of logical lanes to which the plurality of FEC codewords have been multiplexed; storing in the memory bits for the symbol from each logical lane of the plurality of logical lanes; and re-ordering bits stored in the memory according to a mapping that permutes the bits stored in memory to produce a re-ordered block of bits such that when the re-ordered block of bits is distributed to a plurality of modified logical lanes equal in number to the plurality of logical lanes and the plurality of modified logical lanes are bit-multiplexed to at least one physical lane, the at least one physical lane obtains a sequence of groups of bits for a symbol from one FEC codeword followed by a sequence of groups of bits for a symbol from another FEC codeword.

In some aspects, the techniques described herein relate to an apparatus, wherein re-ordering includes re-ordering bits stored in the memory according to the mapping to produce the re-ordered block of bits such that when the re-ordered block of bits is distributed to each of the plurality of modified logical lanes and the plurality of modified logical lanes are bit-multiplexed to create a plurality of physical lanes, each physical lane of the plurality of physical lanes obtains a sequence of groups of bits for a symbol from one FEC codeword followed by a sequence of groups of bits for a symbol from another FEC codeword.

In some aspects, an apparatus is provided including: a memory; and one or more integrated circuits configured with digital logic, or a processor device configured with instructions, to perform operations including: obtaining a stream of bits received for at least one physical lane from which a plurality of modified logical lanes have been de-multiplexed, which plurality of modified logical lanes is equal in number to a plurality of logical lanes from which an original block of bits was re-ordered according to a mapping that permuted the original block of bits to produce a re-ordered block of bits distributed to the plurality of modified logical lanes such that when the plurality of modified logical lanes was bit-multiplexed to the at least one physical lane, the at least one physical lane contains a sequence of a groups of bits for a symbol from one forward error corrected (FEC) codeword followed by a sequence of groups of bits for a symbol from another FEC codeword; storing the re-ordered block of bits obtained from the plurality of modified logical lanes to a memory; performing an inverse of the mapping on the re-ordered block of bits stored in the memory to obtain the original block of bits; and distributing the original block of bits to the plurality of logical lanes.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   for each forward error corrected (FEC) codeword of a plurality of FEC codewords of data to be transmitted over a channel, obtaining a symbol from each logical lane of a plurality of logical lanes to which the plurality of FEC codewords have been multiplexed;
   storing bits for the symbol from each logical lane of the plurality of logical lanes into a memory; and
   re-ordering bits stored in the memory according to a mapping that permutes the bits stored in memory to produce a re-ordered block of bits distributed to a plurality of modified logical lanes equal in number to the plurality of logical lanes and the plurality of modified logical lanes are bit-multiplexed to at least one physical lane, resulting in the at least one physical lane obtaining a sequence of groups of bits for a symbol from one FEC codeword followed by a sequence of groups of bits for a symbol from another FEC codeword.

2. The method of claim 1, wherein the re-ordered block of bits is distributed to each of the plurality of modified logical lanes and the plurality of modified logical lanes are bit-multiplexed to create a plurality of physical lanes, resulting in each physical lane of the plurality of physical lanes obtaining a sequence of groups of bits for a symbol from one FEC codeword followed by a sequence of groups of bits for a symbol from another FEC codeword.

3. The method of claim 1, wherein the sequence of groups of bits are for the same symbol for an FEC codeword.

4. The method of claim 1, where a number of the plurality of FEC codewords is two FEC codewords, and the sequence of groups of bits alternates, over time, for symbols between the two FEC codewords.

5. The method of claim 4, wherein the number of the plurality of modified logical lanes is 16 and the number of physical lanes is 2, or the number of the plurality of modified logical lanes is 8 and the number of physical lanes is one.

6. The method of claim 1, where a number of the plurality of FEC codewords is four FEC codewords, and the sequence of groups of bits alternates, over time, for symbols between the four FEC codewords.

7. The method of claim 6, wherein the number of the plurality of modified logical lanes is 32 and the number of the plurality of physical lanes is 4 or 8.

8. The method of claim 1, wherein the bits in each sequence of groups of bits are in any order for a symbol for an FEC codeword.

9. The method of claim 1, wherein each group in the sequence of groups is two or more bits.

10. An apparatus comprising:
    a memory; and
    one or more integrated circuits configured with digital logic, or a processor device configured with instructions, to perform operations including:
    for each forward error corrected (FEC) codeword of a plurality of FEC codewords of data to be transmitted over a channel, obtaining a symbol from each logical lane of a plurality of logical lanes to which the plurality of FEC codewords have been multiplexed;
    storing in the memory bits for the symbol from each logical lane of the plurality of logical lanes; and
    re-ordering bits stored in the memory according to a mapping that permutes the bits stored in memory to produce a re-ordered block of bits distributed to a plurality of modified logical lanes equal in number to the plurality of logical lanes and the plurality of modified logical lanes are bit-multiplexed to at least one physical lane, resulting in the at least one physical lane obtaining a sequence of groups of bits for a symbol from one FEC codeword followed by a sequence of groups of bits for a symbol from another FEC codeword.

11. The apparatus of claim 10, wherein the re-ordered block of bits is distributed to each of the plurality of modified logical lanes and the plurality of modified logical lanes are bit-multiplexed to create a plurality of physical lanes, resulting in each physical lane of the plurality of physical lanes obtaining a sequence of groups of bits for a symbol from one FEC codeword followed by a sequence of groups of bits for a symbol from another FEC codeword.

12. The apparatus of claim 11, wherein the sequence of groups of bits are for the same symbol for an FEC codeword.

13. The apparatus of claim 11, wherein the bits in each sequence of groups of bits are in any order for a symbol for an FEC codeword.

14. The apparatus of claim 11, wherein each group in the sequence of groups is two or more bits.

15. One or more non-transitory computer readable storage media encoded with instructions that, when executed by a computer processor, cause the computer processor to perform operations including:
    for each forward error corrected (FEC) codeword of a plurality of FEC codewords of data to be transmitted over a channel, obtaining a symbol from each logical lane of a plurality of logical lanes to which the plurality of FEC codewords have been multiplexed;
    storing bits for the symbol from each logical lane of the plurality of logical lanes into a memory; and
    re-ordering bits stored in the memory according to a mapping that permutes the bits stored in memory to produce a re-ordered block of bits distributed to a plurality of modified logical lanes equal in number to the plurality of logical lanes and the plurality of modified logical lanes are bit-multiplexed to at least one physical lane, resulting in the at least one physical lane obtaining a sequence of groups of bits for a symbol from one FEC codeword followed by a sequence of groups of bits for a symbol from another FEC codeword.

16. The one or more non-transitory computer readable storage media of claim 15, wherein the re-ordered block of bits is distributed to each of the plurality of modified logical lanes and the plurality of modified logical lanes are bit-multiplexed to create a plurality of physical lanes, resulting in each physical lane of the plurality of physical lanes obtaining a sequence of groups of bits for a symbol from one FEC codeword followed by a sequence of groups of bits for a symbol from another FEC codeword.

17. The one or more non-transitory computer readable storage media of claim 15, wherein the sequence of groups of bits are for the same symbol for an FEC codeword.

18. The one or more non-transitory computer readable storage media of claim 15, wherein a number of the plurality of FEC codewords is two FEC codewords, and the sequence of groups of bits alternates, over time, for symbols between the two FEC codewords.

19. The one or more non-transitory computer readable storage media of claim 18, wherein the number of the plurality of modified logical lanes is 16 and the number of physical lanes is 2, or the number of the plurality of modified logical lanes is 8 and the number of physical lanes is one.

20. The one or more non-transitory computer readable storage media of claim 15, where a number of the plurality of FEC codewords is four FEC codewords, and the sequence of groups of bits alternates, over time, for symbols between the four FEC codewords.

21. The one or more non-transitory computer readable storage media of claim 20, wherein the number of the plurality of modified logical lanes is 32 and the number of the plurality of physical lanes is 4 or 8.

22. The one or more non-transitory computer readable storage media of claim 15, wherein the bits in each sequence of groups of bits are in any order for a symbol for an FEC codeword.

* * * * *